(12) United States Patent
Deboy et al.

(10) Patent No.: US 9,793,803 B2
(45) Date of Patent: Oct. 17, 2017

(54) POWER CONVERTER CIRCUIT

(71) Applicant: Infineon Technologies Austria AG, Villach (AT)

(72) Inventors: Gerald Deboy, Klagenfurt (AT); Klaus Krischan, Graz (AT); Rolf Weis, Dresden (DE)

(73) Assignee: Infineon Technologies Austria AG, Villach (AT)

( * ) Notice: Subject to any disclaimer, the term of this patent is extended or adjusted under 35 U.S.C. 154(b) by 368 days.

(21) Appl. No.: 13/838,625

(22) Filed: Mar. 15, 2013

(65) Prior Publication Data

US 2014/0266131 A1    Sep. 18, 2014

(51) Int. Cl.
  *H02M 3/158* (2006.01)
  *H02M 3/156* (2006.01)
  *H02M 1/00* (2006.01)

(52) U.S. Cl.
  CPC ......... *H02M 3/158* (2013.01); *H02M 3/1584* (2013.01); *H02M 3/156* (2013.01); *H02M 2001/0074* (2013.01)

(58) Field of Classification Search
  CPC . H02M 2001/0074; H02M 2001/0077; H02M 2001/0083; H02M 3/285; H02J 3/38
  USPC .............. 363/65; 323/271, 272, 225; 307/82
  See application file for complete search history.

(56) References Cited

U.S. PATENT DOCUMENTS

| | | | |
|---|---|---|---|
| 6,021,057 A * | 2/2000 | Linden et al. | 363/65 |
| 6,218,792 B1 * | 4/2001 | Berth et al. | 318/38 |
| 6,278,264 B1 | 8/2001 | Burstein et al. | |
| 6,462,522 B2 | 10/2002 | Burstein et al. | |
| 6,731,523 B2 * | 5/2004 | Jitaru | 363/65 |
| 7,102,901 B2 * | 9/2006 | Falk et al. | 363/65 |
| 7,602,624 B2 * | 10/2009 | Nakashima | H02M 3/1584 323/225 |
| 8,456,144 B2 * | 6/2013 | Chatroux | H02M 3/1584 323/235 |
| 8,536,735 B2 * | 9/2013 | Yan et al. | 307/77 |
| 2004/0036452 A1 | 2/2004 | Brooks et al. | |
| 2005/0185430 A1 * | 8/2005 | Vinciarelli | H02M 3/157 363/65 |
| 2005/0213267 A1 | 9/2005 | Azrai et al. | |
| 2006/0291260 A1 * | 12/2006 | Nakashima | 363/65 |
| 2007/0159862 A1 * | 7/2007 | Vinciarelli | 363/65 |
| 2008/0157732 A1 | 7/2008 | Williams | |

(Continued)

FOREIGN PATENT DOCUMENTS

| | | |
|---|---|---|
| DE | 19630284 A1 | 7/1996 |
| WO | 2008047374 A2 | 4/2008 |

(Continued)

OTHER PUBLICATIONS

Leong, K., "Summary of the Integrated Mulit-phase Buck Converter," Mar. 26, 2012, 16 pages.

*Primary Examiner* — Kyle J Moody
(74) *Attorney, Agent, or Firm* — Slater Matsil, LLP

(57) ABSTRACT

A power converter circuit includes an input and an output. A supply circuit is configured to receive an input signal from the input and to generate a number of supply signals from the input signal. A number of converter units are provided. Each of the plurality of converter units is configured to receive one of the plurality of supply signals and to output an output signal to the output.

29 Claims, 13 Drawing Sheets

(56) References Cited

U.S. PATENT DOCUMENTS

| | | | |
|---|---|---|---|
| 2009/0103333 A1* | 4/2009 | Trattler | 363/17 |
| 2009/0168475 A1* | 7/2009 | Hirosawa | H02M 3/1584 363/84 |
| 2011/0267845 A1* | 11/2011 | Ye et al. | 363/21.02 |
| 2012/0007431 A1* | 1/2012 | Jang | H02J 4/00 307/82 |
| 2014/0253066 A1* | 9/2014 | Teh | H02M 3/1584 323/272 |
| 2016/0268898 A1* | 9/2016 | Deboy | H02M 3/158 |

FOREIGN PATENT DOCUMENTS

| | | |
|---|---|---|
| WO | 2012113764 A2 | 8/2012 |
| WO | WO 2012/106965 A1 | 8/2012 |
| WO | WO 2012/113248 A1 | 8/2012 |

\* cited by examiner

POWER CONVERTER CIRCUIT

TECHNICAL FIELD

Embodiments of the present invention relate to a power converter circuit, in particular a switched-mode power converter circuit with a plurality of converter stages.

BACKGROUND

Switched-mode power converters are widely used in automotive, industrial, consumer electronics or information technology (IT) applications for converting an input voltage into an output voltage received by a load. In many applications, such as CPU (Central Processing Unit) powering applications, it is required to generate an output voltage with a relatively low level from a higher input voltage. For example, modern CPUs require a supply voltage with a voltage level of only 3V, 1.8V, or 1.2V. In this type of application a first power converter may convert a grid voltage (with 22VRMS or 110VRMS AC) into a first DC supply voltage with a level of, for example, 12V, and a second power converter transforms the first supply voltage into the low DC supply voltage required by the CPU.

Multi-phase converters include a plurality of converter units that are connected in parallel and that each provide a portion of the power consumption of the load. Each of the converter units includes at least one semiconductor switch that is operated in a pulse-width modulated (PWM) fashion. A PWM operation of the at least one semiconductor switch involves losses, wherein these losses, at a given output power of the converter unit, increase as the voltage blocking capability of the semiconductor switch increases. In a conventional multi-phase converter, the voltage blocking capability of the at least one switch in each converter unit is at least the difference between the input voltage and the output voltage of the multi-phase converter.

SUMMARY OF THE INVENTION

According to one aspect, this disclosure describes a power converter circuit. The power converter circuit includes an input and an output, a supply circuit configured to receive an input signal from the input and to generate a plurality of supply signals from the input signal, and a plurality of converter units, wherein each of the plurality of converter units is configured to receive one of the plurality of supply signals and to output an output signal to the output.

According to another aspect, this disclosure describes a method. The method includes receiving an input signal from an input and generating a plurality of supply signals from the input signal by a supply circuit; and receiving one of the plurality of supply signals and outputting an output signal to an output by each of a plurality of converter units.

According to yet another aspect, this disclosure describes a power converter circuit including a plurality of semiconductor devices integrated in a semiconductor body. The semiconductor body includes at least one ring structure with a ring-shaped first semiconductor region located between a first ring-shaped electrically conducting line, and a second ring-shaped electrically conducting line, and a second semiconductor region surrounded by the first semiconductor region. A first semiconductor device is integrated in the ring-shaped first semiconductor region and is connected between the first ring-shaped electrically conducting line, and a second ring-shaped electrically conducting line. A second semiconductor device is integrated in the second semiconductor region and is connected between the second ring-shaped electrically conducting line and a contact pad in the second semiconductor region.

BRIEF DESCRIPTION OF THE DRAWINGS

Examples will now be explained with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF ILLUSTRATIVE EMBODIMENTS

In the following detailed description, reference is made to the accompanying drawings. The drawings form a part of the description and by way of illustration show specific embodiments in which the invention may be practiced. It is to be understood that the features of the various embodiments described herein may be combined with each other, unless specifically noted otherwise.

Figure 1:
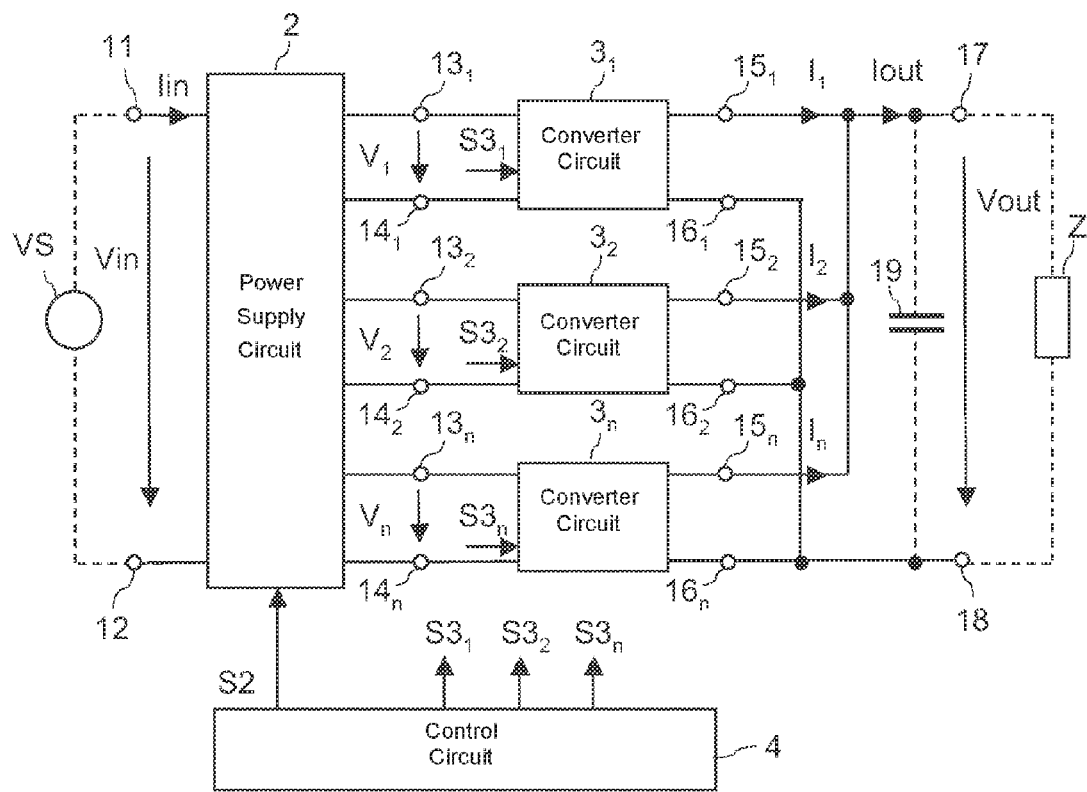
FIG. 1 illustrates one embodiment of a power converter circuit that includes a power supply circuit, a plurality of converter units coupled to the power supply circuit, and a control circuit.

FIG. 1 illustrates one embodiment of a power converter circuit 1. The power converter circuit 1 includes an input 11, 12 for receiving an input voltage Vin and an input current Iin, and an output 17, 18 for outputting an output voltage Vout and an output current Iout. According to one embodiment, the input voltage Vin is a direct voltage (DC voltage). This input voltage Vin may be provided by a conventional power source VS (illustrated in dashed lines in FIG. 1), such as a switched-mode power supply, a battery, or the like. A voltage level of the input voltage Vin is, for example, between 5V and 50V, in particular between 10V and 30V.

The output voltage Vout and the output current Iout can be supplied to a load Z (illustrated in dashed lines in FIG. 1). According to one embodiment, the output voltage Vout is lower than the input voltage Vin. For example, the output voltage Vout is about 1.2V, 1.8V, or about 3V. The load Z may be, for example, a CPU (Central Processing Unit) of a computer.

According to one embodiment, the power converter circuit 1 is configured to control the output voltage Vout to be substantially constant. In this case, the output current Iout may vary dependent on a power consumption of the load Z. When, for example, the input voltage Vin is substantially constant, then also the input current Iin may vary dependent on the power consumption of the load Z.

The output 17, 18 includes a first output node 17 and a second output node 18 in the present embodiment. Optionally, an output capacitor 19 is coupled between the first and second output nodes 17, 18. The output voltage Vout is a voltage between the output nodes 17, 18. Equivalently, the input 11, 12 includes a first input node 11, and a second input node 12, wherein the input voltage Vin is a voltage between the first and the second input nodes 11, 12.

According to one embodiment, the input voltage Vin and the output voltage Vout are referenced to the same reference potential, such as ground. In this case, the second input node 12, and the second output node 18 are both connected to a node of the power converter circuit where the reference potential is available.

Referring to FIG. 1, the power converter circuit 1 includes a power supply circuit 2 coupled to the input 11, 12. The power supply circuit 2 is configured to receive the input voltage Vin and the input current Iin and to output a plurality of supply voltages $V_1$, $V_2$, $V_n$ from the input voltage Vin. Further, the power converter circuit 1 includes a plurality of converter units $3_1$, $3_2$, $3_n$, wherein each of these converter units $3_1$-$3_n$ receives one of the plurality of supply voltages $V_1$-$V_n$ and is configured to supply an output current $I_1$-$I_n$ to the output 17, 18. The output current Iout of the power converter circuit 1 equals the sum of the output currents $I_1$-$I_n$ of the individual converter units $3_1$-$3_n$. The individual converter units $3_1$-$3_n$ control their output currents $I_1$-$I_n$ such that the output voltage Vout has a predefined set-value. One way of operation principle of the individual converter units $3_1$-$3_n$ is explained in further detail herein below. In the power converter circuit 1 depicted in FIG. 1, the power supply circuit 2 outputs n=3 supply voltages $V_1$-$V_n$, and n=3 converter units $3_1$-$3_n$ are coupled to the power supply circuit 2. However, this is only an example. The number n of converter units implemented in the power converter circuit 1 is arbitrary and not limited to n=3.

In FIG. 1, reference characters $13_1$-$13_n$ denote first input nodes of the individual converter units $3_1$-$3_n$, and reference characters $14_1$-$14_n$ denote second input nodes of the individual converter units $3_1$-$3_n$. Each converter unit $3_1$-$3_n$ receives one of the supply voltages $V_1$-$V_n$ between its first input terminal and its second input node. First output nodes $15_1$-$15_n$ of the individual converter units $3_1$-$3_n$ are coupled to one another to form the output node 17 of the power converter circuit 1, and second output nodes $16_1$-$16_n$ are coupled to the second output node 18 of the power converter circuit 1.

Referring to FIG. 1, a control circuit 4 controls the operation of the supply circuit 2 and of the individual converter units $3_1$-$3_n$. In FIG. 1, control signals S2, $S3_1$-$S3_n$ received by the supply circuit 2 and by the individual converter units $3_1$-$3_n$, respectively, are only schematically illustrated. Dependent on the specific implementation of the supply circuit 2 and of the individual converter units $3_1$-$3_n$ each of these circuits may receive two or more control signals, so that the control signal S2, $S3_1$-$S3_n$ illustrated in FIG. 1 may each represent one control signal or two or more control signals.

Figure 2:
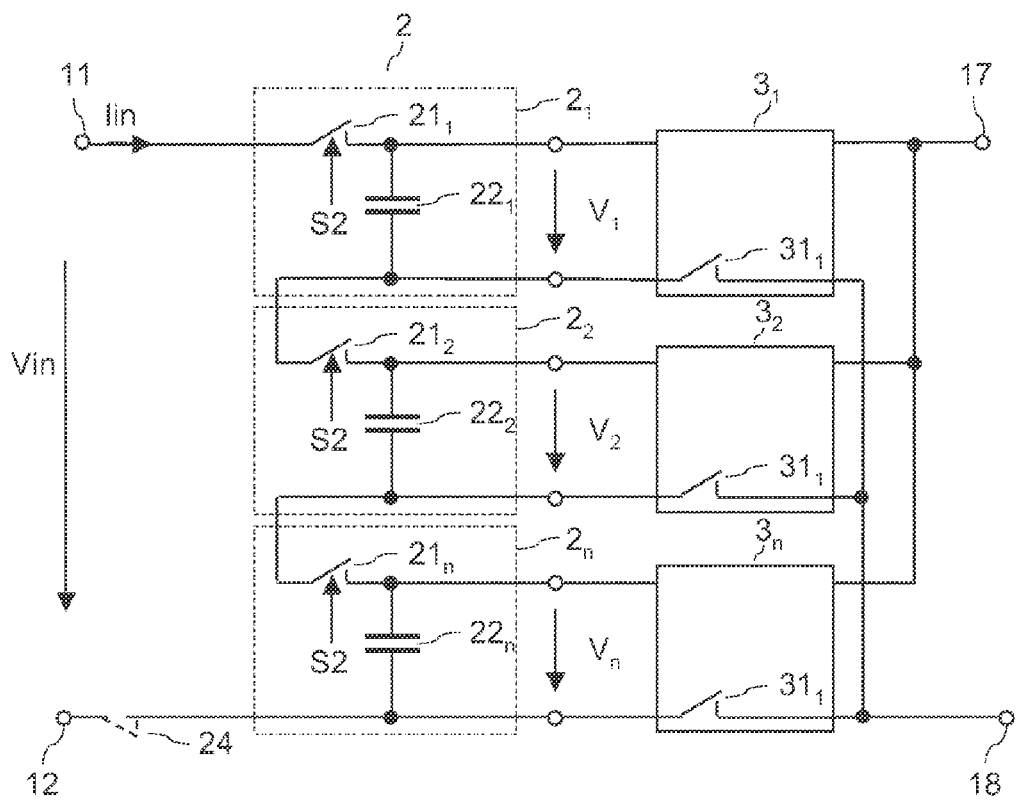
FIG. 2 illustrates one embodiment of a power supply circuit.

FIG. 2 illustrates a first embodiment of the power supply circuit 2. This power supply circuit 2 includes a plurality of power supply units (supply units) $2_1$-$2_n$ connected in series between the first and second input nodes 11, 12. Each of these supply units $2_1$-$2_n$ is configured to output one of the supply voltages $V_1$-$V_n$. Each of the supply units $2_1$-$2_n$ includes a series circuit with a first switch $21_1$-$21_n$ and a first capacitive storage element (capacitor) $22_1$-$22_n$, wherein the supply voltages $V_1$-$V_n$ are available across the first capacitors $22_1$-$22_n$ of the supply units $2_1$-$2_n$.

In the supply circuit 2 of FIG. 2 and in other embodiments of the supply circuit 2 disclosed below like features of the individual supply units $2_1$-$2_n$ have reference characters that can be distinguished from each other by subscript indices "1," "2," "n." In the following, wherein explanation equivalently applies to each of the supply circuits $2_1$-$2_n$ and to their individual components, reference characters without indices will be used. Equivalently, the converter units $3_1$-$3_n$ and their components have reference characters that can be distinguished from each other by subscript indices "1," "2," "n." In the following, wherein explanation equivalently applies to each of the converter units $3_1$-$3_n$ and to their individual components, reference characters without indices will be used.

Each of the individual supply units 2 outputs one of the supply voltages $V_1$-$V_n$ and, therefore, supplies the converter unit ($3_1$-$3_n$ in FIG. 1) connected thereto.

The individual converter units 3 are also illustrated in FIG. 2, one way of their operation is explained in further detail below. Each of the individual supply units 2 receives the energy it supplies to the associated converter unit 3 from the input nodes 11, 12. Each of the individual supply units 2 can be operated in a charging mode, and in a supply mode. In the charging mode, the supply unit 2 receives energy from the input nodes 11, 12 so that the first capacitor 22 of the supply unit 2 is charged. In the supply mode the supply unit 2 is ready to provide energy to the converter unit 3 connected thereto, that is, the supply unit 2 is ready to have the capacitor 22 discharged. Whether the supply unit 2, in the supply mode, actually provides energy to the associated converter unit 3 is dependent on the operation mode of the converter unit. This is explained in further detail below.

In the supply circuit 2 embodiment depicted in FIG. 2, the individual supply units $2_1$-$2_n$ are operated in the charging mode at the same time. In the charging mode, the control circuit 4 (not illustrated in FIG. 2) switches on the first switches $21_1$-$21_n$ of the individual supply units $2_1$-$2_n$. When the first switches $21_1$-$21_n$ are switched on, the capacitors $22_1$-$22_n$ of the individuals supply units $2_1$-$2_n$ are connected in series between the first and second input nodes 11, 12. The individual capacitors $22_1$-$22_n$ are then charged to a supply voltage $V_1$-$V_n$ that is dependent on the input voltage Vin and on the capacitances of the individual capacitors $22_1$-$22_n$. According to one embodiment, the individual capacitors $22_1$-$22_n$ have substantially the same capacitance. In this case, the individual capacitors $22_1$-$22_n$ are charged to the same voltage level at the end of the charging phase, that is $$V_1 = V_2 = V_n = \frac{Vin}{n}, \quad (1)$$

where n is the number of supply units $2_1$-$2_n$ in the supply circuit 2.

Whether the individual first capacitors $22_1$-$22_n$ are completely charged (to the voltage Vin/n in the embodiment explained before) or whether the individual capacitors $22_1$-$22_n$ are only charged partially (to a voltage lower than Vin/n) is dependent on the duration of the charging phase. According to one embodiment, the duration of the charging phase is selected such that the first capacitors $22_1$-$22_n$ are completely charged during the charging phase. At the end of the charging phase, the control circuit 4 opens the first switches $21_1$-$21_n$ and the individual capacitors $22_1$-$22_n$ are ready to be discharged by the individual converter units $3_1$-$3_n$. In this embodiment, the first switches $21_1$-$21_n$ can be switched on and off simultaneously, so that one control signal S2 received from the control circuit 4 can be used to control the individual first switches $21_1$-$21_n$.

Figure 3:
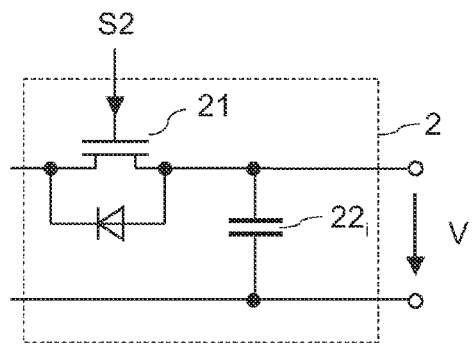
FIG. 3 illustrates one embodiment of power supply unit implemented with a MOSFET switch.

The first switches $21_1$-$21_n$ can be implemented as conventional electronic switches. According to one embodiment, the first switches $21_1$-$21_n$ are transistors. In another embodiment the first switches $21_1$-$21_n$ are relays. FIG. 3 illustrates one embodiment of one supply unit 2 that includes a first switch 21 implemented as a transistor. In this specific embodiment, the transistor is a MOSFET. This MOSFET can be implemented as an n-type MOSFET or as a p-type MOSFET and can be implemented as an enhancement (normally-off) transistor or as a depletion (normally-on) transistor, such as a depletion MOSFET or a JFET (Junction Field-Effect Transistor). The transistors can be implemented using a conventional semiconductor material, such as silicon (Si), silicon carbide (SiC), gallium arsenide (GaAs), gallium nitride (GaN), or the like. The MOSFET has a control terminal (gate terminal) for receiving the control signal S2 and has a load path (drain-source path) connected in series with the capacitor 22. The control circuit 4 is configured to generate a signal level of the control signal S2 dependent on the specific type of MOSFET such that the MOSFET is switched on when the supply unit 2 is in the charging mode and such that the MOSFET is switched off when the supply unit 2 is in the supply mode. The MOSFET 21 may include an internal body diode which is also illustrated in FIG. 3. The polarity of this body diode may be selected such that the capacitor 22 of the supply unit 2 cannot be charged via the body diode. For this, an anode of the body diode is connected to the capacitor 22 in the embodiment of FIG. 3. Implementing the switch 21 as an n-type MOSFET is only an example. Any other type of electronic switch, such as another type of MOSFET, or another type of transistor, such as a BJT (Bipolar Junction Transistor), a JFET (Junction Field-Effect Transistor), or a GaN-HEMT (Gallium-Nitride High Electron-Mobility Transistor) may be used as well. A preferred embodiment is to implement the switches within a Power IC technology supporting lateral power transistors.

Figure 4:
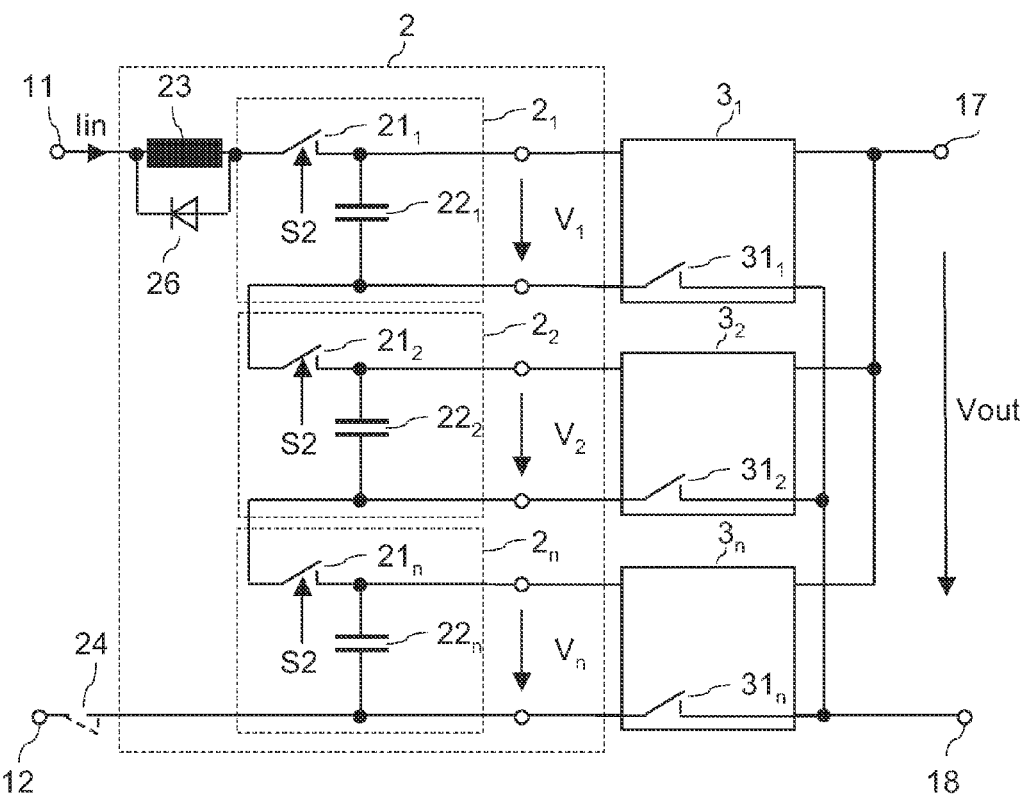
FIG. 4 illustrates another embodiment of the power supply circuit.

FIG. 4 illustrates a further embodiment of the supply circuit 2. In the embodiment of FIG. 4, the supply circuit 2 includes an inductor 23 connected in series with the supply units $2_1$-$2_n$. In the supply circuit of FIG. 2, the input current Iin may have a relatively high current level at the beginning of the charging phase (charging mode). This current level is dependent on how much the individual capacitors $22_1$-$22_n$ have been discharged before. In the supply circuit 2 of FIG. 4, the inductor 23 helps to limit the current level of the input current Iin. Further, the inductor 23 makes it possible to switch on and switch off the switches $21_1$-$24_n$ of the supply units $2_1$-$2_n$ when a current through the inductor 23, and therefore a current through the switches $21_1$-$21_n$ is substantially zero. Referring to FIG. 4, an optional freewheeling element 26, such as a diode, is connected in parallel with the inductor 23. The freewheeling element 26 takes the current through the inductor 23 when the switches $21_1$-$21_n$ switch off before the inductor 23 has been completely demagnetized.

One way of operation of the supply circuit of FIG. 4 is explained with reference to FIG. 5 in which timing diagrams of the operation mode of the supply circuit 2 and of the input current Iin are illustrated. The operation mode is represented by the control signal S2. For explanation purposes, it is assumed that the control signal S2 has a high level (that switches on the individual first switches $21_1$-$21_n$) when the supply circuit 2 is in the charging mode. For explanation purposes, it is further assumed that the individual capacitors $22_1$-$22_n$ are not completely charged at the beginning of the charging mode, that is the sum of the individual supply voltages $V_1$-$V_n$ is lower than the input voltage Vin:

$$\sum_{k=1}^{n} V_k < Vin. \quad (2)$$

Figure 5:
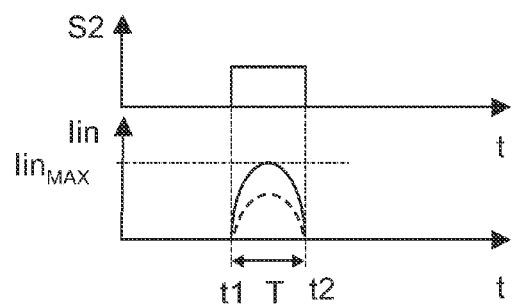
FIG. 5 illustrates one example of the power supply circuit of FIG. 4 in operation.

In this case, the input current Iin increases at the beginning of the charging mode, wherein the beginning of the charging mode is represented by time t1 in FIG. 5. Referring to FIG. 5, the input current Iin increases to a maximum input current $Iin_{max}$ and then decreases to zero. The maximum input current $Iin_{MAX}$ is dependent on the difference between the voltage level of the input voltage Vin and the voltage level of the voltage across the series circuit with the capacitors $22_1$-$22_n$ at the beginning of the charging phase, wherein the maximum input current $Iin_{MAX}$ increases as the voltage difference increases. A charging period T, which is a time period between the beginning of the charging period at time t1 and a time t2 when the input current Iin decreases to zero is independent of the voltage difference and is only dependent on the inductance of the inductor 23 and of an overall capacitance of the capacitor series circuit. According to one embodiment, a time period in which the supply circuit 2 is operated in the charging mode corresponds to the charging period T or is even shorter.

In the embodiment of FIG. 4, the overall voltage across the capacitor series circuit at the end of the charging period can be higher than the input voltage Vin, that is:

$$\sum_{k=1}^{n} V_k > Vin. \qquad (3)$$

Whether the overall voltage is higher than the input voltage Vin is dependent on the point in time when the switches $21_1$-$21_n$ are being turned off. According to one embodiment, the switches $21_1$-$24_n$ turn off when the input current Iin substantially has the maximum (which is between times t1 and t2 in FIG. 5). In this case, the overall voltage corresponds to the input voltage. However, when the switches $21_1$-$21_n$ switch off later, energy that has been (magnetically) stored in the inductor 23, between the first time t1 and the time when the input current Iin reaches the maximum is transferred to the capacitors $22_1$-$22_n$ and causes the overall voltage to increase to above the input voltage Vin. In order to prevent the capacitors $22_1$-$22_n$, from being discharged, the switches $22_1$-$22_n$ should be switched off when or before the input current Iin turns zero.

In the charging mode, the supply voltages $V_1$-$V_n$ output by the individual supply units $2_1$-$2_n$ are referenced to different electrical potentials. The supply voltage of the supply unit $2_n$ directly connected to the second input node 12 is referenced to the electrical potential at the second input node 12. This electrical potential at the second input node 12 will be referred to as reference potential (ground) in the following. The supply unit $2_n$ directly connected to the second input node 12 will be referred to as lowermost supply unit in the following, and the converter unit $3_n$ coupled to the lowermost supply unit $2_n$ will be referred to as lowermost converter unit in the following.

The supply voltage $V_2$ of the supply unit $2_2$ adjacent the lowermost supply unit $2_n$ is referenced to P12+$V_n$, where P12 denotes the reference potential and denotes the supply voltage of the lowermost supply unit $2_n$. Equivalently, the supply voltage $V_1$ of the supply unit $2_1$ is referenced to P12+$V_n$+$V_2$. In general, in the charging mode, the supply voltage $V_i$ of one supply unit $2_i$ (wherein $2_i$ denotes an arbitrary one of the supply units $2_1$-$2_n$) is referenced to $$P12 + \sum_{k=i+1}^{n} V_k. \qquad (4)$$

When the supply units $2_1$-$2_n$ are in the supply mode, the individual supply voltages $V_1$-$V_n$ are referenced to the same reference potential, namely the potential at the second output node 18. For this purpose, each of the converter units $3_1$-$3_n$ includes a second switch $31_1$-$31_n$ connected between the capacitor $22_1$-$22_n$ of the corresponding supply unit $2_1$-$2_n$ and the second output node 18. These second switches are schematically illustrated in the converter units $3_1$-$3_n$ of FIGS. 2 and 4. The control circuit 4 controls these second switches $21_1$-$21_n$ to be switched off (to be open) when the corresponding supply unit $2_1$-$2_n$ is in the charging mode. In the lowermost converter unit $3_n$, the second switch $31_n$ is optional.

Besides the charging mode and the supply mode of a supply unit 2 there may be a standby mode in which the capacitor 22 has been charged and in which the first switch 21 and the second switch 31 are open. In this operation mode, the supply voltage V provided by the supply unit 2 is floating.

Optionally, a further switch 24 is connected between the series circuit with the supply units $2_1$-$2_n$ and the second input node 12. This further switch 24 is switched on and off simultaneously with the first switches $21_1$-$21_n$. In this embodiment, the lowermost converter unit $3_n$ also includes a second switch $31_n$. In this embodiment, the input voltage Vin and the output voltage Vout can be referenced to different reference potentials. That is, the input voltage Vin can be referenced to a first reference potential, namely the potential at the second input node 12, and the output voltage Vout can be referenced to a second reference potential namely the potential at the second output node 18.

According to a further embodiment, the second switch of one of the converter units $3_1$-$3_n$ that is not the lowermost converter unit $3_n$ is omitted, while the lowermost converter unit $3_n$ includes the second switch $31_n$. For explanation purposes, it is assumed that the second switch $31_2$ of the second converter unit $3_2$ is omitted. In this case, the output voltage Vout is referenced to the electrical potential at one of the terminals of the capacitor $22_2$ of the corresponding supply unit $2_2$.

Different topologies are possible for implementing the converter units $3_1$-$3_n$. Two possible implementations are explained with reference to FIGS. 6 and 8 below.

Figure 6:
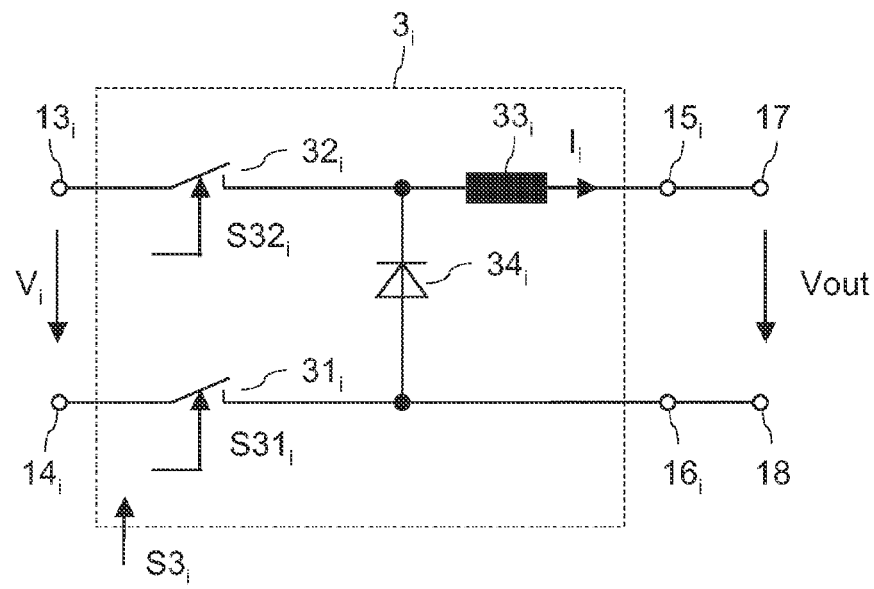
FIG. 6 illustrates a one embodiment of a converter unit of FIG. 1 in greater detail.

FIG. 6 shows one embodiment of a converter unit $3_i$ (wherein $3_i$ represents an arbitrary one of the converter units $3_1$-$3_n$). This converter unit $3_i$ is implemented with a buck converter topology and includes a series circuit with a third switch $32_i$ and an inductor $33_i$ connected between a first input node $13_i$ and a first output node $15_i$, wherein the first output node $15_i$ is connected to the first output node 17 of the power converter circuit 1. A freewheeling element $34_i$ is connected between a second output node $16_i$ and a circuit node common to the third switch 32 and the inductor $33_i$. The second output node $16_i$ is the output node that is connected to the second output node 18 of the power converter circuit 1. The freewheeling element $34_i$ can be implemented as a conventional freewheeling element, such as a diode or a synchronous rectifier (SR) MOSFET. The third switch $32_i$ will be referred to as control switch in the following.

One way of operation of the converter unit $3_i$ of FIG. 6 is explained with reference to FIG. 7 that shows timing diagrams of a control signal $S31_i$ controlling the second switch $31_i$, of a control signal $S32_i$ controlling the control switch $32_i$, and of the output current $I_i$ of the converter unit $3_i$. The control signal $S31_i$ controlling the second switch $31_i$ will be referred to as supply mode control signal in the following, and the control signal $S32_i$ controlling the control switch $32_i$ will be referred to as current control signal, because this control signal helps to control the output current $I_i$. This is explained in greater detail below.

According to one embodiment, the control signal $S32_i$ is a pulse-width modulated (PWM) signal that drives the control switch $32_i$ in a pulse-width modulated (PWM) fashion. That is, there is a plurality of subsequent drive periods, wherein in each drive period the control signal $S32_i$ switches on the control switch $32_i$ for an on-period $T_{ON}$ and switches off the control switch $32_i$ for an off-period $T_{OFF}$. According to one embodiment, the periods $T_{PWM}$ of the individual drive cycles are identical, wherein a duty cycle, which is a ratio between the on-period $T_{ON}$ and the duration $T_{PWM}$ of the drive cycle, may vary. For explanation purposes, it is assumed that a high level of the drive signal $S32_i$ of FIG. 7 represents an on-state of the control switch $32_i$, while a low level of the drive signal $S32_i$ represents an off-state of the control switch $32_i$.

Figure 7:
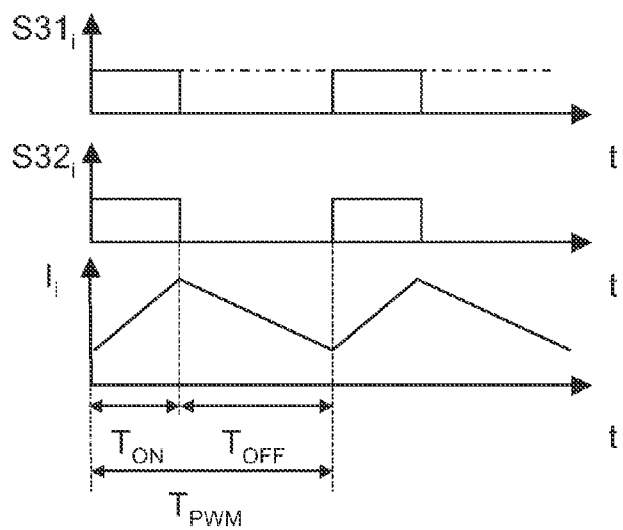
FIG. 7 shows timing diagrams that illustrate one example of the converter unit of FIG. 6 in operation.

Referring to FIG. 7, the output current L increases during the on-period $T_{ON}$ and decreases during the off-period $T_{OFF}$. FIG. 7 shows the timing diagram of the output current $I_i$ in the steady state of the converter unit $3_i$ and in a continuous current mode (CCM). CCM is an operation mode in which the output current L does not decrease to zero during the off-period $T_{OFF}$. The average output current L can be varied by varying the duty cycle of the control signal $S32_i$. The average output current can be increased by temporarily increasing the duty cycle, and the average output current can be decreased by temporarily decreasing the duty cycle. The control signal $S32_i$ controlling the control switch $32_i$ will also be referred to as current control signal in the following. In the steady state the duty cycle is substantially constant, such as, for example, about 0.25 (if, e.g., n=4 and Vout is about 1V).

It is also possible to operate the converter unit $3_i$ in a discontinuous current mode (DCM) in which the output current $I_i$ decreases to zero during the off-period $T_{OFF}$.

During the on-period $T_{ON}$ energy is magnetically stored in the inductor $33_i$. During the off-period, the energy stored in the inductor $33_i$ causes the output current $I_i$ to continue to flow, wherein the freewheeling element $34_i$ provides a freewheeling path that allows the output current $I_i$ to continue to flow.

In the converter unit $3_i$ of FIG. 6, the second switch $31_i$ is connected between the second input node $14_i$ and the freewheeling current path with the rectifier element $34_i$ and the inductor $33_i$ so that the freewheeling current can flow when the second switch $31_i$ has been switched off. Referring to the explanation before, the converter unit $3_i$ is in the supply mode when the second switch $31_i$ is switched on. According to one embodiment (illustrated in solid lines in FIG. 7), the second switch $31_i$ and the control switch $32_i$ are switched on and off simultaneously by their corresponding control signals $S31_i$, $S32_i$. In this case, the second switch $31_i$ and the control switch $32_i$ can be controlled by a common control signal $S3_i$, and the supply unit (not shown in FIG. 6) coupled to the converter unit $3_i$ is in the supply mode only when the control switch $32_i$ is switched on. The supply unit may be re-charged between subsequent on-times of the control switch $31_i$.

According to a further embodiment, the first switch $31_i$ is switched on before the control switch $32_i$ switches on, so that there is a delay time between switching on the first switch $31_i$ and the control switch 32.

According to a further embodiment, there are two or more drive cycles of the control switch $31_i$ before the corresponding supply unit is recharged. In this case, the second switch $31_i$ is kept in the on-state for several drive cycles. This is illustrated in dashed-and-dotted lines in FIG. 7.

According to yet another embodiment, the second switch $31_i$ is operated as the control switch and the control switch $32_i$ serves to match the electrical potentials. That is, in this embodiment, the first switch $31_i$ is driven in a PWM fashion as explained in connection with the control switch $32_i$ herein before, and the control switch $32_i$ can be operated like the second switch $31_i$ explained herein before. This is beneficial when the freewheeling element 34 and the first switch $31_1$ are implemented as transistors, in particular as MOSFETs. In this case, these transistors can be driven using drive voltages that can be referenced to the same reference potential, namely the potential at the circuit node common to the second switch $31_1$ and the freewheeling element $34_i$ so that these drive voltages can be produced by a common driver.

Figure 8:
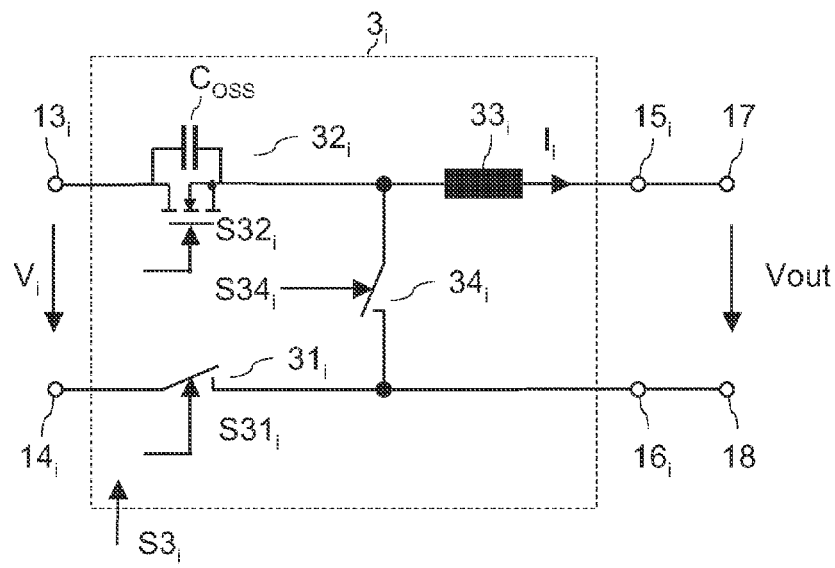
FIG. 8 illustrates another embodiment of a converter unit of FIG. 1 in greater detail.
Figure 9:
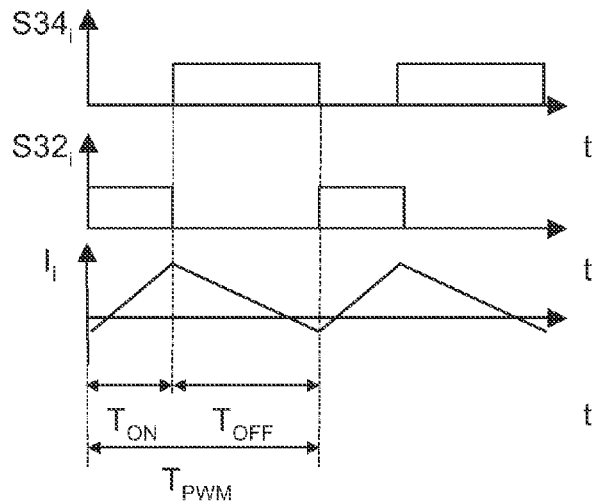
FIG. 9 shows timing diagrams that illustrate the converter unit of FIG. 8 in operation.

When the diode $34_i$ of FIG. 6 is replaced with a switch that acts as a freewheeling element, the converter unit $3_i$ can be operated in a zero-voltage switching (ZVS) mode. The zero-voltage mode is, in particular, useful when the control switch $32_i$ is a switch with an output capacitance that charges when the control switch $32_i$ switches off. FIG. 8 shows one embodiment of the converter unit $3_i$ that includes a switch $34_i$ as the freewhelling element and that includes a MOSFET with an output capacitance $C_{OSS}$ as the control switch $32_i$. One way of operation of this converter unit $3_i$ in the zero-voltage switching mode is explained with reference to FIG. 9 that shows timing diagrams of the output current Iin, the control signal $S32_i$ of the control switch $32_i$, and the control signal $S34_i$ of the freewheeling switch $34_i$.

In the zero-voltage switching mode, the freewheeling switch $34_i$ switches on when the control switch $32_i$ switches off, and the freewheeling switch $34_i$ stays in the on-state until the output current Tin changes the current flow direction (turns negative). This negative current (slightly) magnetizes the inductor $33_i$. The voltage across the output capacitor $C_{OSS}$ of the control switch $32_i$ substantially corresponds to the difference between input voltage $V_i$ and output voltage Vout, when the control switch $32_i$ is in the off-state. When the freewheeling switch $34_i$ switches off, the current induced by the magnetized inductor $33_i$ discharges the output capacitor $C_{OSS}$ of the control switch $32_i$, so that the control switch $32_i$ can be switched on when the voltage across the control switch $32_i$ is substantially zero. This helps to reduce switching losses.

Especially when the converter unit $3_i$ is operated in the DCM or in the ZVS mode, the inductor can be implemented with a lower inductance than in the CCM mode. The switching frequency of the switch driven in the PWM fashion (that is the control switch $32_i$ or the first switch $31_i$) is, for example, several MHz, such as 10 MHz, or even more.

Figure 10:
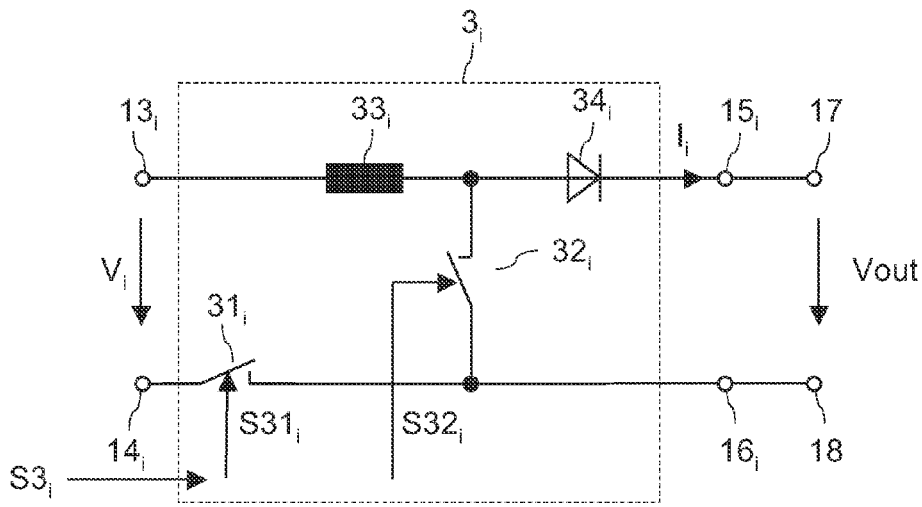
FIG. 10 illustrates another embodiment of one converter unit of FIG. 1 in greater detail.

In the converter unit of FIG. 6, a maximum voltage level of the output voltage Vout is lower than a voltage level of a supply voltage $V_i$. FIG. 10 shows an embodiment of a converter unit $3_i$ that can generate an output voltage Vout with a higher voltage level than the supply voltage $V_i$. This converter unit $3_i$ has a boost converter topology. In this embodiment, a series circuit with an inductor $33_i$ and a control switch $32_i$ is connected between the input nodes $13_i$, $14_i$. Further, a rectifier element $34_i$ is connected between a circuit node common to the inductor $33_i$ and the control switch $32_i$ and the first output node $15_i$. Like in the embodiment of FIG. 6, the control switch $32_i$ is driven in a PWM fashion, wherein each time the switch $32_i$ is switched on, energy is magnetically stored in the inductor $33_i$. The energy stored in the inductor $33_i$ is at least partially transferred to the output nodes $15_i$, $16_i$ when the control switch $32_i$ is switched off. The control switch $32_i$ and the second switch $31_i$ can be switched on an off simultaneously. When the second switch $31_i$ has been switched off, the further rectifier element $35_i$ allows the output current $I_i$ to flow.

Figure 11:
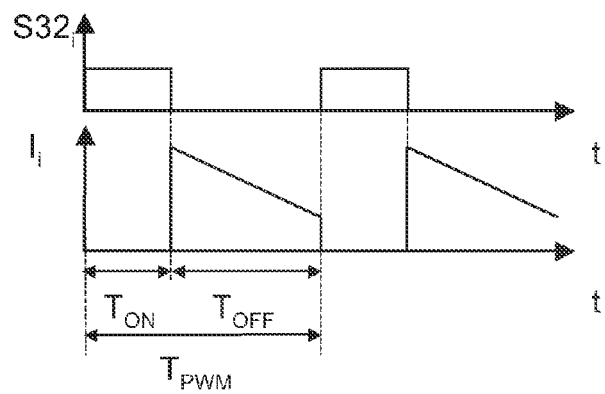
FIG. 11 shows timing diagrams that illustrate the converter unit of FIG. 8 in operation.

Timing diagrams of the control signal $S32_i$ of the control switch $32_i$ and the output current $I_i$ are illustrated in FIG. 11. In this embodiment, the output current $I_i$ only flows during the off-period Like in the embodiment of FIG. 6, an average of the output current $I_i$ can be controlled by adjusting the duty cycle of the control signal $S32_i$.

Each of the converter units $3_i$ explained before can be operated in a continuous current mode (CCM), a discontinuous current mode (DCM), or in the ZVS mode. Further, the converter unit $3_i$ can be implemented with a topology other than a buck converter topology (see FIGS. 6 and 8) and a boost converter topology (see FIG. 10) as well. A further possible converter unit topology is, for example, a buck-boost converter topology, or a boost-buck converter topology.

Figure 12:
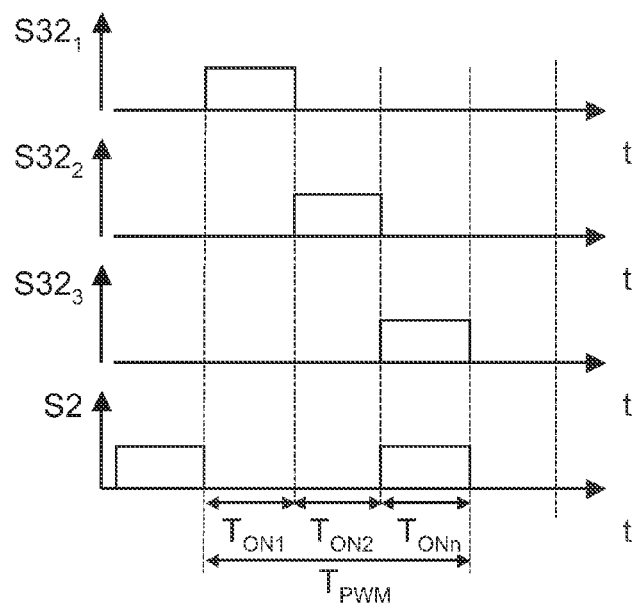
FIG. 12 shows timing diagrams that illustrate one embodiment of a power converter circuit including a supply circuit of FIG. 2 or 4 in operation.

FIG. 12 shows timing diagrams illustrating one way of operation of a power converter circuit 1 of FIG. 1 implemented with a supply circuit 2 of one of FIGS. 2 and 4, and implemented with a plurality of converter units $3_i$-$3_n$ in accordance with one of the embodiments of FIGS. 6 and 8. FIG. 12 shows timing diagrams of the control signals $S32_1$-$S32_n$ of the control switch $32_i$ of each converter unit $3_1$-$3_n$. The second switch $31_i$ can be controlled as explained before, that is, the second switch $31_i$ and the control switch $32_i$ of each one converter unit $3_i$ can be controlled simultaneously, or the second switch $31_i$ is already switched on before the control switch switches on. FIG. 12 shows timing diagrams of PWM control signals $S3_1$, $S3_2$, $S3_n$, wherein each of these control signals controls the control switch ($32_i$ in FIGS. 6 and 8) and the second switch ($31_i$ in FIGS. 6 and 8) of one of the converter units $3_1$-$3_n$. FIG. 12 further shows a timing diagram of the supply circuit control signal S2 that controls the charging mode of the individual supply units $2_1$-$2_n$. In this embodiment, the individual supply units $2_1$-$2_n$ are operated in the charging mode simultaneously.

Referring to FIG. 12, each of the control signals $S3_1$-$S3_n$ can assume an on-level and an off-level. For explanation purposes, it is assumed that a high-level of a control signal $S3_1$-$S3_n$ received by a converter unit $3_1$-$3_n$ corresponds to the on-level an switches on the control switch ($32_i$ in FIGS. 6 and 8) and the second switch of the converter unit $3_1$-$3_n$, while a low-level corresponds to the off-level and switches off the control switch and the second switch. Equivalently, a high level of the supply circuit control signal S2 represents a charging mode of the supply units $2_1$-$2_n$.

In the operation scenario illustrated in FIG. 12, the control circuit 4 operates the individual converter units $3_1$-$3_n$ such that the control switch of only one converter unit is switched on at one time. That is, on-periods $T_{ON1}$, $T_{ON2}$, $T_{ONa}$ of the control switches in the individual converter units $3_1$-$3_n$ do not timely overlap. Referring to explanation above, the individual converter units can be operated in one of the DCM mode, ZVS mode, and the CCM mode, wherein the ZVS mode shows the lowest switching losses. In FIG. 12, the control signal $S3_n$ is the control signal of lowermost converter unit $3_n$ coupled to the lowermost supply unit $2_n$. When the input voltage Vin and the output voltage Vout are referenced to the same reference potential, the lowermost supply unit $2_n$ can be operated in the charging mode and in the supply mode at the same time. That is, the control switch of the converter unit $3_n$ can be switched on to receive power from the lowermost supply unit $2_n$ while the capacitor $22_n$ is coupled to the input 11, 12. Thus, in the embodiment of FIG. 12, the on-period $T_{ONn}$ of the control switch of the converter unit $3_n$ and the charging mode period of the supply unit $2_n$ may overlap. The "charging mode period" is the time period when the supply unit is in the charging mode.

Figure 13:
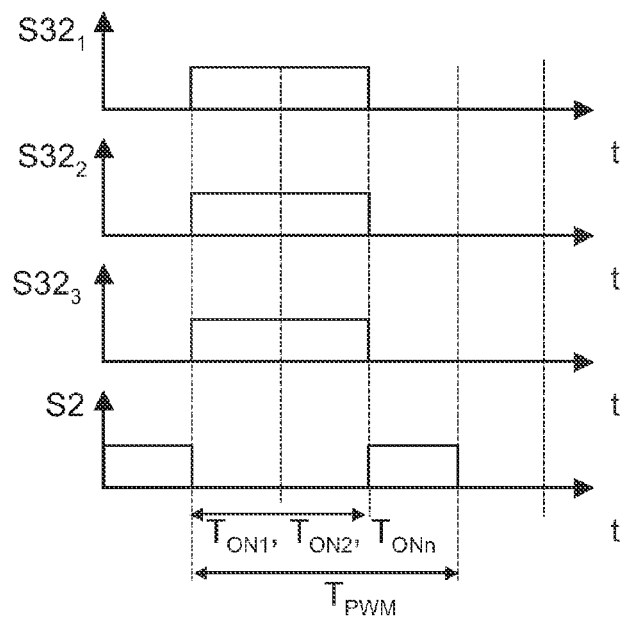
FIG. 13 shows timing diagrams illustrating another embodiment of power converter circuit including a supply circuit of FIG. 2 or 4 in operation.

FIG. 13 illustrates a further embodiment for operating the power supply circuit 1. In this embodiment, the control switches in the individual converter units $3_1$-$3_n$ are substantially switched on and off simultaneously. In this embodiment, the charging mode period and the on-period $T_{ONn}$ of the lowermost converter unit $3_n$ do not overlap. The supply circuit 2 is operated in the charging mode after the on-periods $T_{ON1}$, $T_{ON2}$, $T_{ONn}$. This mode enables to increase the output current extremely rapidly and can be used, for example, temporarily for short time periods to follow rapid changes of the load.

Figure 14:
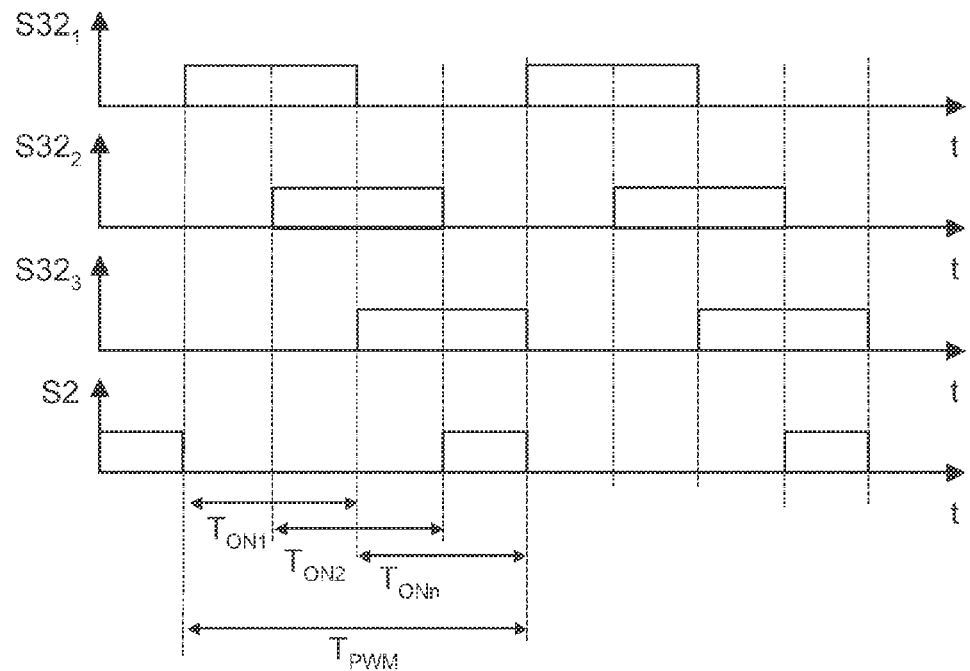
FIG. 14 shows timing diagrams that illustrate another embodiment of a power converter circuit including a supply circuit of FIG. 2 or 4 in operation.

According to a further embodiment illustrated in FIG. 14, the individual converter units are operated in a interleaved fashion such that the on-periods $T_{ON1}$, $T_{ON2}$, $T_{ONn}$ of the control switches (and the second switches) in the individual converter units $3_1$-$3_n$ overlap. In case the input voltage Vin and the output voltage Vout are referenced to the same reference potential, the charging mode period and the on-period $T_{ONn}$ of the control switch in the lowermost converter unit $3_n$ may overlap. However, the charging mode period may only overlap a part of the on-period $T_{ONn}$ in which none of the other control switches is switched on. That is, the charging mode period should not overlap one of the other on-periods $T_{ON1}$, $T_{ON2}$.

Although FIGS. 12 to 14 illustrates one way of operation of a power converter circuit with n=3 converter units the operation explained with reference to these FIGS. 12 to 14 applies to power converter circuits including only two (n=2) or including more than three (n>3) converter units equivalently.

In each of the embodiments explained with reference to FIGS. 12 to 14, the control circuit 4 may control the output currents of the individual converter units $3_1$-$3_n$ such that the (average) level of the output voltage Vout corresponds to a predefined reference voltage, or may control the output currents of the individual converter units $3_1$-$3_n$ such that the (average) level of the output current Iout corresponds to a predefined reference current. In particular, in an operation mode in which the converter units $3_1$-$3_n$ control the output current Iout the optional output capacitor (illustrated in dashed lines in FIG. 1) can be omitted.

The control circuit 4 may control the individual converter units $3_1$-$3_n$ such that the control signals $S32_1$-$S32_n$ have the same duty cycle in one drive cycle $T_{PWM}$.

According to a further embodiment, the control circuit 4 controls one of the converter units, such as converter unit $3_1$, as a master converter unit such that a duty cycle of the corresponding control signal $S3_1$ is dependent on the output voltage Vout (or dependent on the output current Iout), and controls the other converter units, such as converter units $3_2$-$3_n$, as slave converter units such that output currents $I_2$-$I_n$ of these other converter units substantially correspond to the output current $I_1$ of the converter unit $3_1$. The output currents of the slave converter units can be controlled by adjusting the duty cycle of the control signals $S31_1$-$S32_n$. In this embodiment, output currents $I_1$-$I_n$ of the individual converter units $3_1$-$3_n$ are substantially balanced. The converter unit $3_1$ acts as a master converter unit and the other converter units $3_2$-$3_n$ act as slave converter units in this embodiment.

According to another embodiment, the individual converter units $3_1$-$3_n$ are controlled independently of each other such that each converter unit $3_1$-$3_n$ supplies a predefined output current to the output 17, 18, wherein the output currents $I_1$-$I_n$ of the individual converter units $3_1$-$3_n$ can be mutually different.

According to yet another embodiment, the individual controller units $3_1$-$3_n$ are controlled independently of each other to generate a same predefined output voltage level at the output 17, 18.

Figure 15:
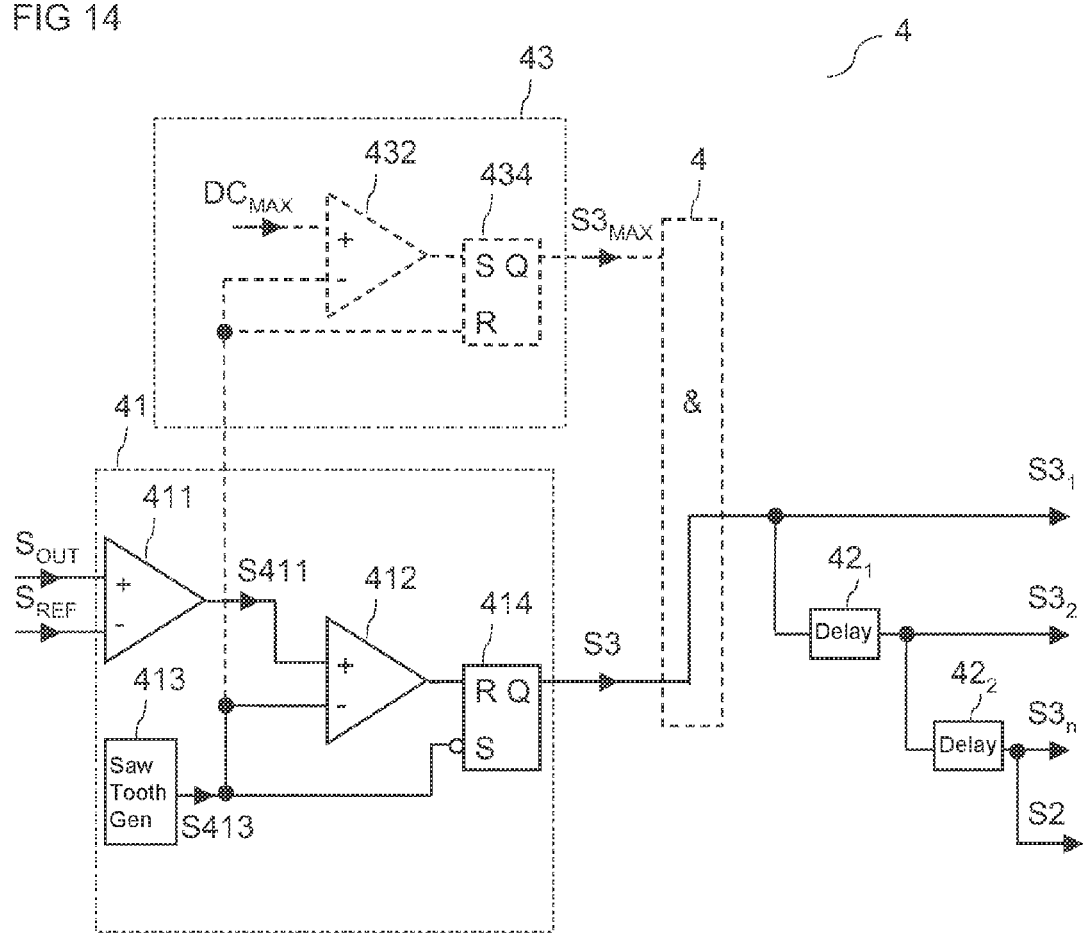
FIG. 15 illustrates one embodiment of a control circuit.

FIG. 15 illustrates one embodiment of the control circuit 4 configured to operate the power converter circuit 1 in accordance with the operation scenario illustrated in FIG. 12 and such that the individual control signals $S3_1$-$S3_n$ have the same duty cycle. Referring to FIG. 15, the control circuit 4 includes a PWM generator 41 configured to receive an output signal $S_{OUT}$ representing one of the output voltage Vout and the output current Iout, and a reference signal $S_{REF}$. The PWM generator 41 is configured to output a PWM signal S3 dependent on the output signal $S_{OUT}$ and the reference signal $S_{REF}$. In the embodiment of FIG. 15, the PWM generator 41 includes a controller 411 that is configured to output a regulation signal S411 dependent on a relationship between the output signal $S_{OUT}$ and the reference signal $S_{REF}$. A comparator 412 receives the regulation signal S411 and a sawtooth signal S413 from a sawtooth generator 413. A flip-flop 414 is set each time a falling edge of the sawtooth signal S413 occurs and is reset each time the sawtooth signal reaches the regulation signal S411. The PWM signal S3 is available at the output of the flip flop 414. The PWM signal S32 generated by the PWM generator 41 is used as the control signal $S3_1$ in the converter unit $3_1$. Further, time delayed versions of this PWM signal S3 are generated using a first and a second delay element $42_1$, $42_2$, wherein the first delay element $42_1$ delays the first control signal $S3_1$ and outputs the control signal $S3_2$ for the converter unit $3_2$, and the second delay element $42_2$ delays the second control signal $S32_2$ and outputs the control signal $S3_n$ to the lowermost converter unit $3_n$. The supply circuit control signal S2 corresponds to the control signal $S3_n$ of the lowermost converter unit $3_n$ in this embodiment.

Figure 16:
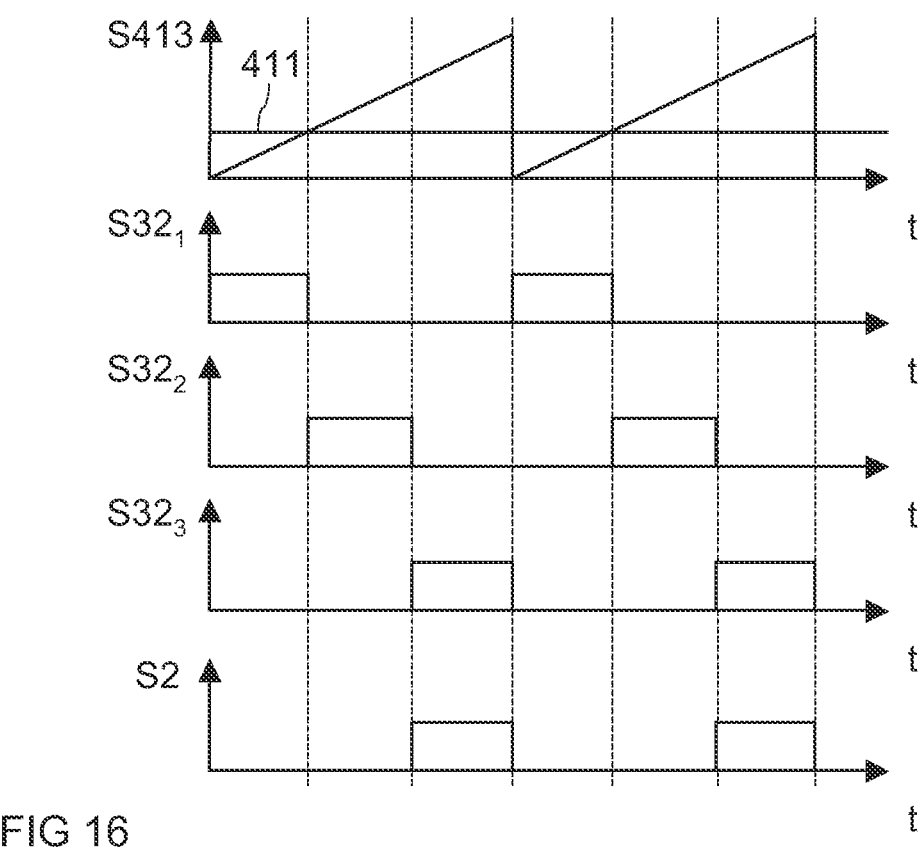
FIG. 16 shows timing diagrams that illustrate an embodiment of the control circuit of FIG. 15 in operation.

One way of operation of the control circuit 4 is illustrated in FIG. 16 in which timing diagrams of the sawtooth signal S413, the regulation signal S411 and of the control signals $S3_1$-$S3_n$ are illustrated. The period of one drive cycle of one converter unit is defined by the frequency of the sawtooth signal, wherein $T_{PWM}=1/f_{SW}$, wherein $f_{SW}$ is the frequency of the sawtooth signal. The delay time introduced by each of the delay elements $42_1$, $42_2$ is $T_{PWM}/3$ in a power converter circuit with n=3 converter units. In general, n−1 delay elements are required to generate n control signals for n different converter units, wherein the delay time introduced by each of the delay elements is $T_{PWM}/n$. The duty cycles of the individual control signals are identical and are dependent on a relationship between the output signal $S_{OUT}$ and the reference signal $S_{REF}$. The controller 411 provides the regulation signal S411. The controller can be a conventional P-controller, I-controller, PI-controller, or PID-controller.

Optionally, the duty cycle of the control signals $S3_1$-$S3_n$ is limited to a predefined maximum $S_{MAX}$. A duty cycle limiting circuit 43 includes a comparator 432 corresponding to the comparator 412 of the PWM generator, and a flip flop 434 corresponding to the flip flop 414 of the PWM generator 41. The comparator 432 of the limiting circuit 43 receives a maximum duty cycle signal $DC_{MAX}$ instead of the regulation signal. A PWM signal $S3_{MAX}$ output by the limiting circuit 43 represents a PWM signal with a maximum duty cycle. An optional logic gate 44 receives the maximum PWM signal $S3_{MAX}$ and the PWM signal S3 output by the PWM generator 32. The first control signal $S32_1$ in this embodiment is either the PWM signal S3 output by the PWM generator 41 or is the maximum PWM signal S43, whichever has the lower duty cycle. According to one embodiment, the logic gate 44 is an AND gate.

Figure 17:
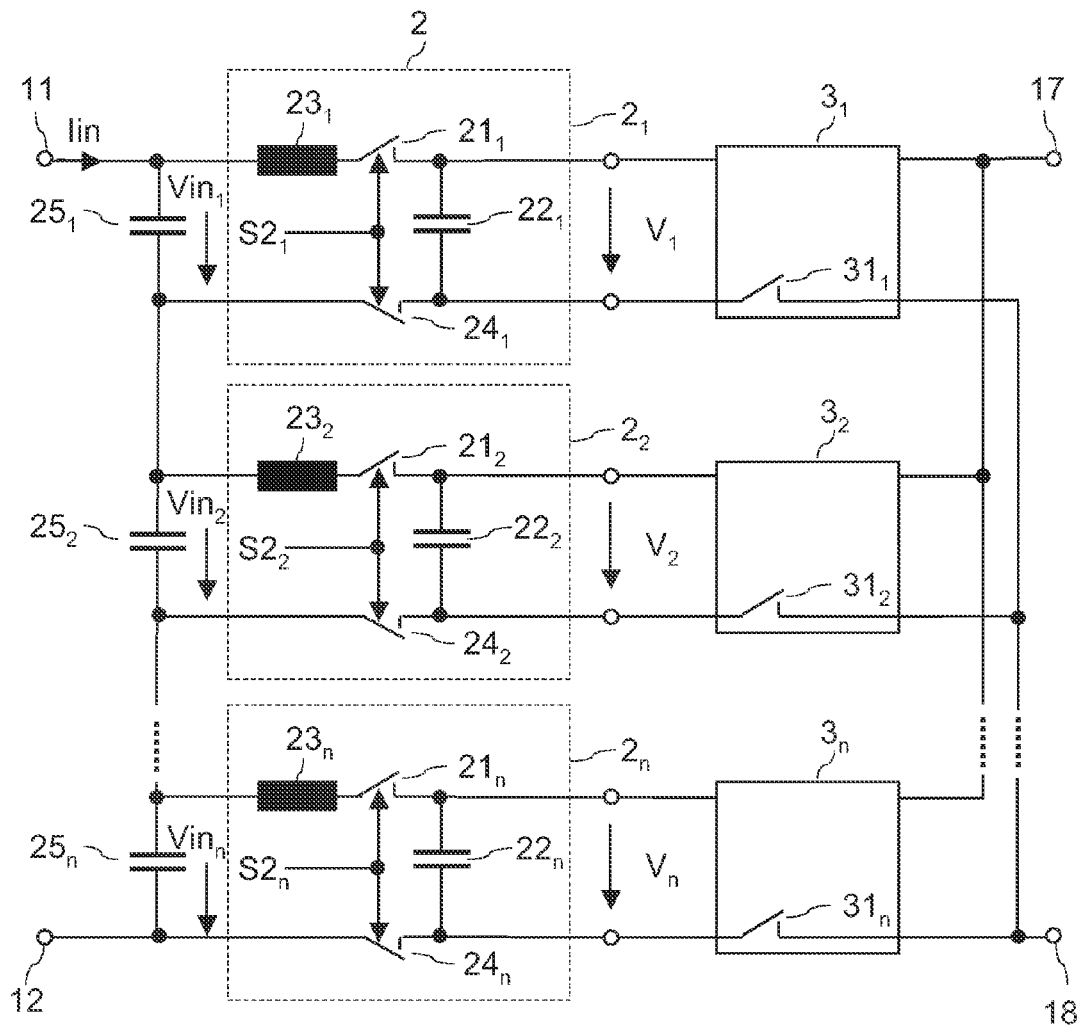
FIG. 17 illustrates a power converter circuit including a supply circuit according to another embodiment.

In the supply circuit of FIG. 2 the individual supply units $2_1$-$2_n$ are operated in the charging mode simultaneously. FIG. 17 illustrates an embodiment of a supply circuit 2 in which the individual supply units $2_1$-$2_n$ can be operated in the charging mode independently. In this embodiment, the supply circuit 2 includes a plurality of second capacitive storage elements (capacitors) $25_1$-$25_n$ that are connected in series between the input nodes 11, 12. Each of these second capacitors $25_1$-$25_n$ is connected in parallel with one of the supply units $2_1$-$2_n$, wherein the individual supply units $2_1$-$2_n$ are connected in series between the input nodes 11, 12. Like in the embodiment of FIG. 2, each of the supply units $2_1$-$2_n$ includes a capacitor $22_1$-$22_n$ and a first switch $21_1$-$21_n$ connected in series with the capacitor $22_1$-$22_n$. Further, each supply unit $2_1$-$2_n$ includes an inductor $23_1$-$23_n$ connected in series with the capacitor $22_1$-$22_n$ and the first switch $21_1$-$21_n$. Further, except for the lowermost supply unit $2_n$ each supply unit $2_1$-$2_n$ includes a further switch $24_1$-$24_n$ connected in series with the capacitor $22_1$-$22_n$, the first switch $21_1$-$21_n$ and the inductor $23_1$-$23_n$. The series circuit with the capacitor, the first switch, the inductor and the further switch of one supply unit $2_1$-$2_n$ is connected in parallel with the second capacitor $25_1$-$25_n$ coupled to the corresponding supply unit $2_1$-$2_n$.

The further switch $24_n$ of the lowermost supply unit $2_n$ is optional. In each of the supply units $2_1$-$2_n$ that include a first switch $21_1$-$21_n$ and a further switch $24_1$-$24_n$, the capacitor $22_1$-$22_n$ is connected between these switches. The supply voltage $V_1$-$V_n$ provided by the individual supply units $2_1$-$2_n$ is the voltage across the capacitor $22_1$-$22_n$ of the individual supply unit $2_1$-$2_n$.

In the supply circuit 2 of FIG. 17 each of the second capacitors $25_1$-$25_n$ supplies an input voltage $Vin_1$-$Vin_n$ to one supply unit $2_1$-$2_n$. The voltage levels of the individual input voltages $Vin_1$-$Vin_n$ is dependent on the overall input voltage Vin between the input nodes 11, 12 and is dependent on the capacitances of the individual second capacitors $25_1$-$25_n$. According to one embodiment, the capacitances of the individual second capacitors $25_1$-$25_n$ are substantially equal. In this case, the individual input voltages $Vin_1$-$Vin_n$ are equal and correspond to Vin/n.

The inductors $23_1$-$23_n$ in the individual supply units $2_1$-$2_n$ are optional. Like in the embodiment explained with reference to FIG. 4, these inductors help to prevent high inrush currents into the first capacitors $22_1$-$22_n$ of the individual supply units $2_1$-$2_n$. It is also possible, to implement some of the supply units $2_1$-$2_n$ with an inductor and to implement others of the supply units $2_1$-$2_n$ without the inductor.

The operation of the individual supply units $2_1$-$2_n$ is identical. One way of operation of one supply unit 2 (wherein reference character 2 denotes one of the supply units $2_1$-$2_n$) is explained in the following. The supply unit 2 is operated in the charging mode when the first switch 21 and the second switch 24 is switched on. In this case, the first capacitor 22 is connected in parallel with the second capacitor 25, so that the second capacitor 22 is charged to the supply voltage provided by the second capacitor 25 (or, by virtue of the inductors $23_1$-$23_n$, to a voltage higher than this supply voltage). At the end of the charging mode the first switch 21 and the further switch 24 are switched off. After the charging phase the first capacitor 22 can be operated in the supply mode. For this purpose, the second capacitor 22 is coupled to the second output node 18 via the second switch 31 of the converter unit 3 coupled to the supply unit 2.

The further switches $24_1$-$24_n$ of the supply units $2_1$-$2_n$ protect the second capacitors $25_1$-$25_n$ from being discharged when the supply units $2_1$-$2_n$ are operated in the supply mode. The lowermost supply unit $2_n$ can be operated in the charging mode and in the supply mode at the same time if the second input node 12 and the second output node 18 are referenced to the same reference potential. In case the second input node 12 and the second output node 18 are reference to different reference potentials, the lowermost supply unit $2_1$ includes the further switch $24_n$, and the converter unit $3_n$ coupled to the lowermost supply unit $2_n$ includes the second switch $31_n$.

Figure 18:
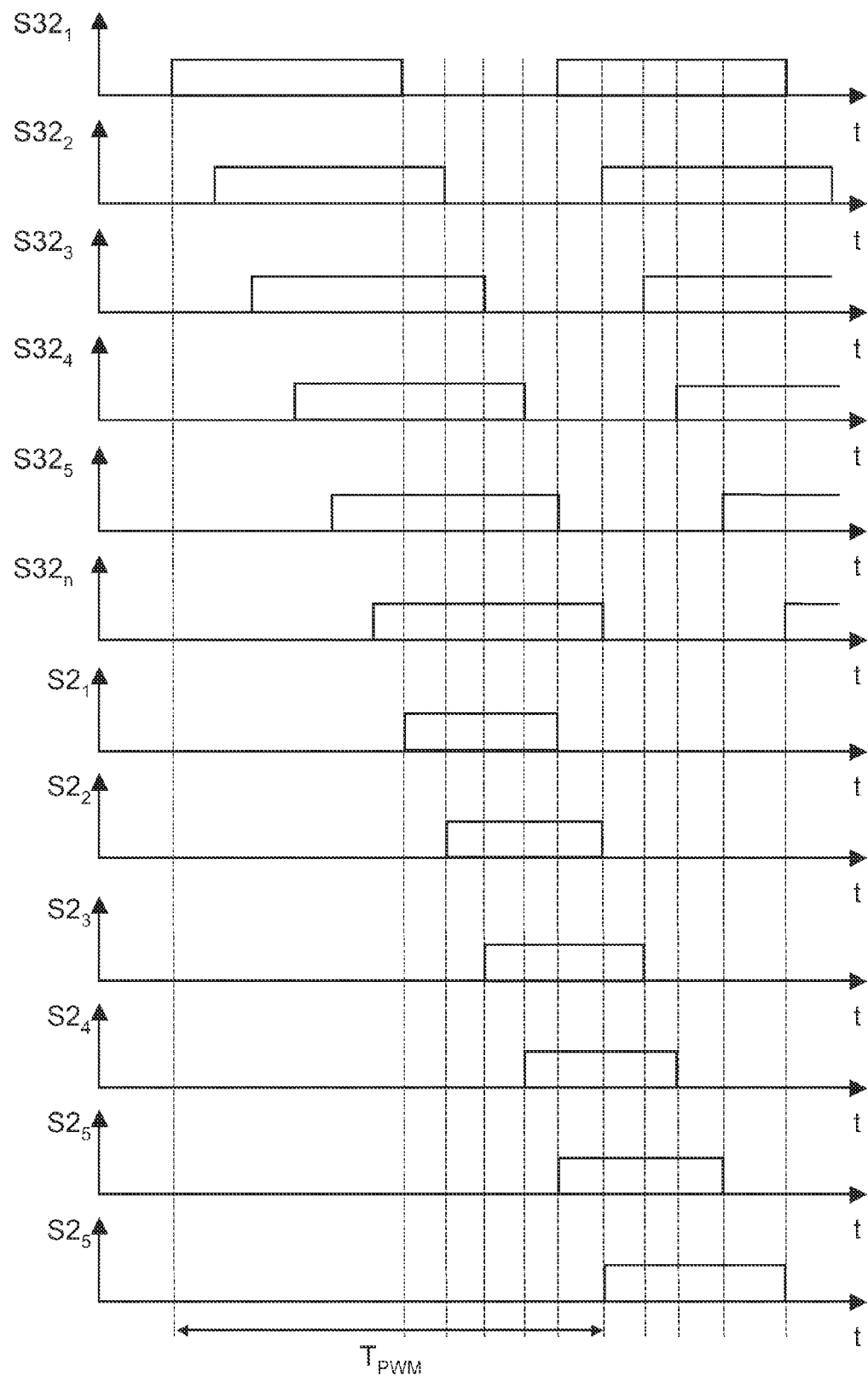
FIG. 18 shows timing diagrams that illustrate the power converter circuit of FIG. 17 in operation.

One way of operation of a power converter circuit including a supply circuit 2 of FIG. 17 is explained with reference to FIG. 18 below. For explanation purposes, it is assumed that the supply circuit 2 includes n=6 supply units, wherein each of these supply units supplies one of n=6 converter units. FIG. 18 shows timing diagrams of control signals $S32_1$-$S32_n$ wherein each of these control signals controls the control switch in one of the converter units. Further, timing diagrams of supply circuit control signals $S2_1$-$S2_n$ are illustrated. Each of these supply circuit control signals $S2_1$-$S2_n$ controls the operation of one of the supply units $2_1$-$2_n$, wherein supply circuit control signal $S2_1$ controls the operation of the supply unit $2_1$ coupled to converter unit $3_1$ that receives control signal $S3_1$, supply circuit control signal $S2_2$ controls the operation of the supply unit $2_2$ coupled to converter unit $3_2$ that receives control signal $S3_2$, and so on.

In the embodiment of FIG. 18, a high level of one supply circuit control signal $S2_1$-$S2_n$ represents a charging mode of the corresponding supply unit $2_1$-$2_n$, and a high level of a converter control signal $S3_1$-$S3_n$ represents a time period in which a converter unit $3_1$-$3_n$ receives energy from the corresponding supply unit $2_1$-$2_n$. That is, a high level of one converter control signal $S3_1$-$S3_n$ represents the supply mode of the corresponding supply unit $2_1$-$2_n$.

In the embodiment of FIG. 18, the individual converter units are operated in an interleaved fashion wherein each supply unit is recharged after the control switch of the corresponding drive unit has been switched off. That is, a supply circuit control signal $S2_1$-$S2_n$ assumes a signal level (a high level in the present embodiment) that operates the corresponding supply unit $2_1$-$2_n$ in the charging mode after the control signal $S32_1$-$S32_n$ of the converter unit $3_1$-$3_n$ coupled to the supply unit assumes an off-level. The length of the charging cycle can reach maximum the duration, where the control switch $32_i$ of the corresponding converter unit $3_i$ is in the off-state.

Figure 19:
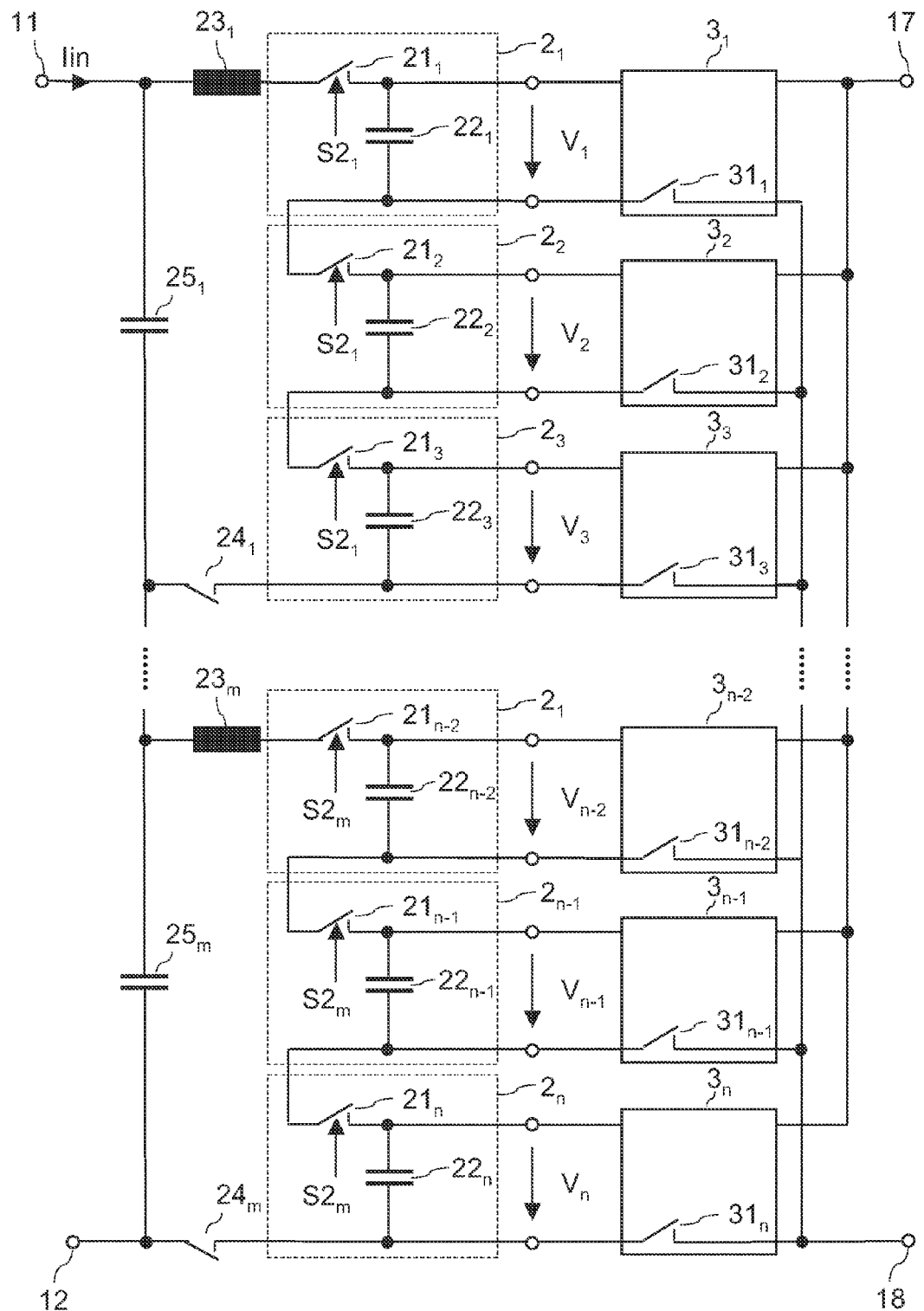
FIG. 19 illustrates a power converter circuit including a supply circuit according to a further embodiment.

FIG. 19 illustrates a further embodiment of a supply circuit. This supply circuit is a combination of the supply circuits explained with reference to FIGS. 2 and 17. In the embodiment of FIG. 19, m second capacitors $25_1$, $25_m$ are connected between the input nodes 11, 12, wherein each of these second capacitors $25_1$, $25_m$ is connected in parallel with a series circuit including some the pluralities of supply units $2_1$-$2_n$. In the embodiment of FIG. 19 there are two second capacitors $25_1$-$25_m$ connected between the input nodes 11, 12, and a series circuit with three supply units is connected in parallel with each second capacitor $25_1$, $25_m$. Each of the supply units includes a first capacitor $25_1$-$25_n$ and a first switch $21_1$, $21_n$. Optionally, an inductor $23_1$, $23_n$ is connected in series with each of the supply unit series circuits. Each of the supply unit series circuits connected in parallel with one second capacitor $25_1$, $25_m$ has a lowermost supply unit, which is supply unit $2_3$ in the series circuit connected in parallel with the second capacitor $25_1$, which is supply unit $2_n$ in the series circuit connected in parallel with the second capacitor $25_m$. Supply unit $2_n$ is the lowermost supply unit of the overall series circuit. A further switch $24_1$, $24_m$ is connected between the lowermost supply unit $2_3$, $2_n$ of each series circuit connected in parallel with one second capacitor $25_1$-$25_m$, wherein the further switch $24_m$ connected to the lowermost supply unit $2_n$ of the overall supply unit series circuit $2_1$-$2_n$ is optional.

Figure 20:
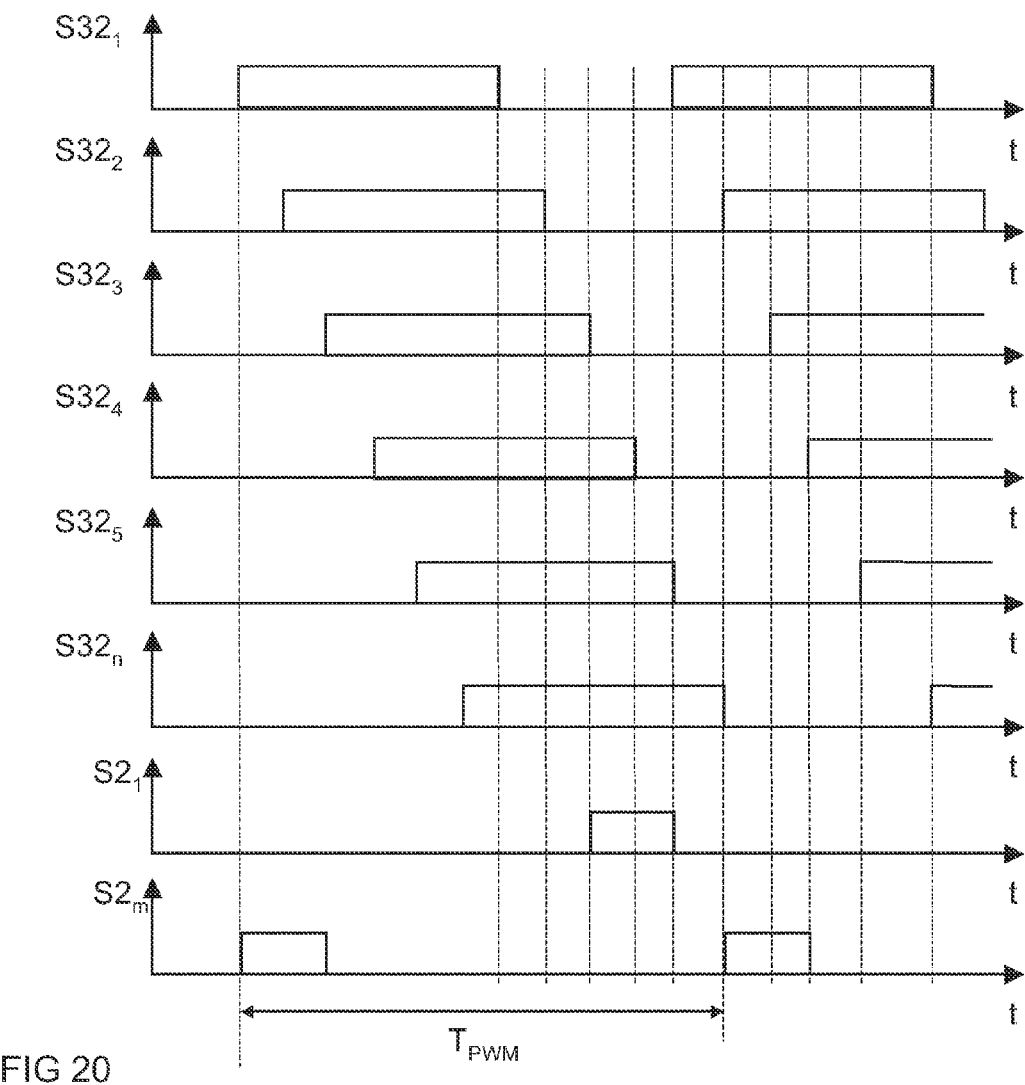
FIG. 20 shows timing diagrams that illustrate the power converter circuit of FIG. 19 in operation.

In the supply circuit 2 of FIG. 19, the supply units coupled to one second capacitor $25_1$, $25_m$ are operated in the charging mode simultaneously and can be operated in the supply mode independently. FIG. 20 shows timing diagrams that illustrate one way of operation of the power converter circuit 18 of FIG. 19. In FIG. 20, $S2_1$ denotes the supply circuit control signal that controls the charging mode of the supply unit $2_1$-$2_3$ of the first series circuit, and $S2_m$ denotes the supply circuit control signal that controls the charging mode of the supply unit $2_3$-$2_n$ of the first series circuit, and $S2_m$ denotes the supply circuit control signal that controls the charging mode of the supply units $2_3$-$2_n$ of the second series circuit. $S3_1$-$S3_n$ denotes the converter control signal of the individual converter units connected to the supply units. Referring to FIG. 20, the individual converter units are operated in an interleaved fashion. A duty cycle is substantially D=0.5 in the present embodiment. The supply units $2_1$-$2_n$ of the first series circuit are re-charged after an activation sequence in which each of the converter units $3_1$-$3_n$ coupled to the supply units $2_1$-$2_3$ of the first series circuit have been activated, and the supply units $2_4$-$2_n$ of the second series circuit are re-charged after an activation sequence in which each of the converter units $3_4$-$3_n$ connected to the supply units $2_4$-$2_n$ of the second series circuit have been activated.

According to one embodiment, the power converter circuit 1 includes m=2 second capacitors $25_1$-$25_m$ and series circuits with three supply units connected in parallel with each second capacitor $25_1$-$25_m$, resulting in an overall number of 6 (=m×3) supply units. However, this is only an example. The number of second capacitors $25_1$-$25_m$ is not restricted to m=2. More than m=2 second capacitors $25_1$-$25_m$ can be used as well, and a series circuit with two or more supply units may be connected in parallel with each second capacitor $25_1$-$25_m$.

In the embodiments explained before, each of the supply units $3_i$ is operated in the supply mode at least once between two subsequent charging cycles. However, this is only an example. It is also possible, e.g., when a power consumption of the load Z is very low (light load operation) to deactivate one or more converter units between two charging cycles. To "deactivate" means that the corresponding converter unit $3_i$ is not operated in the supply mode in the time between two subsequent charging cycles, although the corresponding capacitor $22_i$ has been charged. The at least one converter unit $3_i$ that is deactivated may cyclically change from charging cycle to charging cycle.

The power converter circuit explained before can be implemented with electronic switches that have different voltage blocking capabilities. The second switch $31_1$ of the converter unit $3_1$ connected to the uppermost supply unit $2_1$ requires the highest voltage blocking capability, which is $V_2+V_n$ in the embodiment of FIG. 1. In general, the voltage blocking capability $V31_{MAXi}$ of a second switch $31_i$ is at least:

$$V31_{MAXi} = \sum_{k=i+1}^{n} V_k. \tag{5}$$

In the supply mode, the maximum voltage across the control switch $32_i$ of one converter unit is substantially the difference between the input voltage $V_i$ of the converter unit $3_i$ and the output voltage Vout. However, in the charging mode the maximum voltage across the control switches $32_i$ is higher and is dependent on the converter unit $3_i$ in which the control switch $32_i$ is implemented. For example, the maximum voltage $V32_{MAXi}$ across the control switch $32_1$ of the first converter unit $3_i$ is $(V_1+V_2+V_n)$−Vout=Vin−Vout. In general, the maximum (static) voltage $V32_{MAXi}$ across one control switch $32_i$ is substantially $$V32_{MAXi} = \sum_{k=i}^{n} V_k - Vout. \quad (6)$$

The maximum voltages across the freeweeling elements $34_i$ correspond to the output voltage Vout.

According to one embodiment, the supply circuit 2, the individual converter units $3_1$-$3_n$, and, optionally the inductors $33_I$, are integrated in a first semiconductor chip, and the control circuit 4 is integrated in a second semiconductor chip. According to one embodiment, the control circuit 4 is implemented in a CMOS technology.

Figure 21:
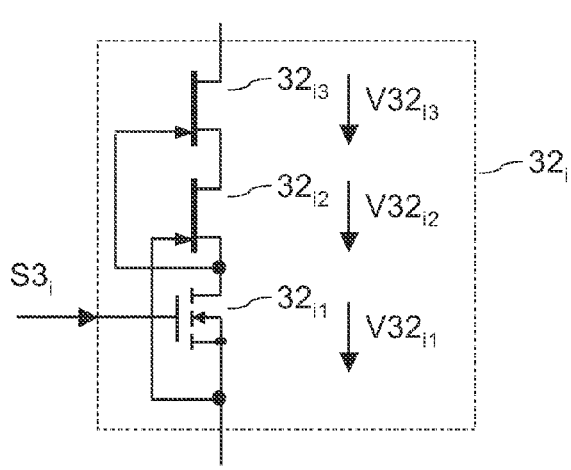
FIG. 21 illustrates one embodiment of a first switch of one converter unit.

According to one embodiment, the first switches $31_1$-$31_n$ of the individual converter units $3_1$-$3_n$ are implemented using several switches (transistors) having a lower voltage blocking capability. FIG. 21 shows one embodiment of a second switch $32_i$. This second switch $32_i$ includes a first transistor $32_{i1}$ and at least one second transistor $32_{i2}$, $32_{i3}$, namely two second transistors $32_{i2}$, $32_{i3}$ in this embodiment. The first transistor $32_{i1}$ and the at least one second transistor $32_{i2}$, $32_{i3}$ are connected in series. The first transistor $32_{i1}$ receives the control signal $S3_i$ and switches on and off dependent on the control signal $S3_i$. The second transistors $32_{i2}$, $32_{i3}$ are connected such that each of these transistors receives as a drive voltage the load path voltage of the first transistor $32_{i1}$ or the load path voltage of another second transistor. In the present embodiment, the load path voltage of one of the first and second transistors is the drain-source voltage $V32_{i1}$, $V32_{i2}$, $V32_{i3}$ of the transistor, and the drive voltage is the gate-source voltage (the voltage between the gate and source terminals). In the present embodiment, a first one $32_{i2}$ of the second transistors receives as a drive voltage the load path voltage $V32_{i1}$ of the first transistor, and a second one $32_{i3}$ of the second transistors receives as a drive voltage the load path voltage $V32_{i2}$ of the second transistor $32_{i2}$.

The operation state of the first transistor $32_{i1}$ governs the operation state of the first switch $32_i$. That is, the first switch $32_i$ is switched on when the first transistor $32_{i1}$ is switched on, and the first switch $32_i$ is switched off, when the first transistor $32_{i1}$ switched off. The second transistors are configured such that transistor $32_{i2}$ switches off when the first transistor $32_{i1}$ switches off and a load path voltage of the first transistor $32_{i1}$ increases. When the transistor $32_{i2}$ switches off, the load path voltage of this transistor increases, so that transistor $32_{i3}$ is switched off. According to one embodiment, the first transistor $32_{i1}$ is implemented as an enhancement (normally-on) MOSFET and the second transistors $32_{i2}$, $32_{i3}$ are implemented as depletion (normally-on) MOSFETs or as Junction FETs (JFETs).

The overall voltage blocking capability of the second switch $32_i$ illustrated in FIG. 21A is dependent on the voltage blocking capabilities of the individual transistors $32_{i1}$-$32_{i3}$ connected in series and on the number of second transistors $32_{i2}$-$32_{i3}$ connected in series with the first transistor $32_{i1}$, wherein the voltage blocking capability increases as the number of transistors $32_{i2}$-$32_{i3}$ connected in series increases. Thus, by simply varying the number of second transistors $32_{i1}$-$32_{i3}$ connected in series with the first transistor $32_{i1}$ first switches $32_i$ with different voltage blocking capabilities can be realized.

Figure 22:
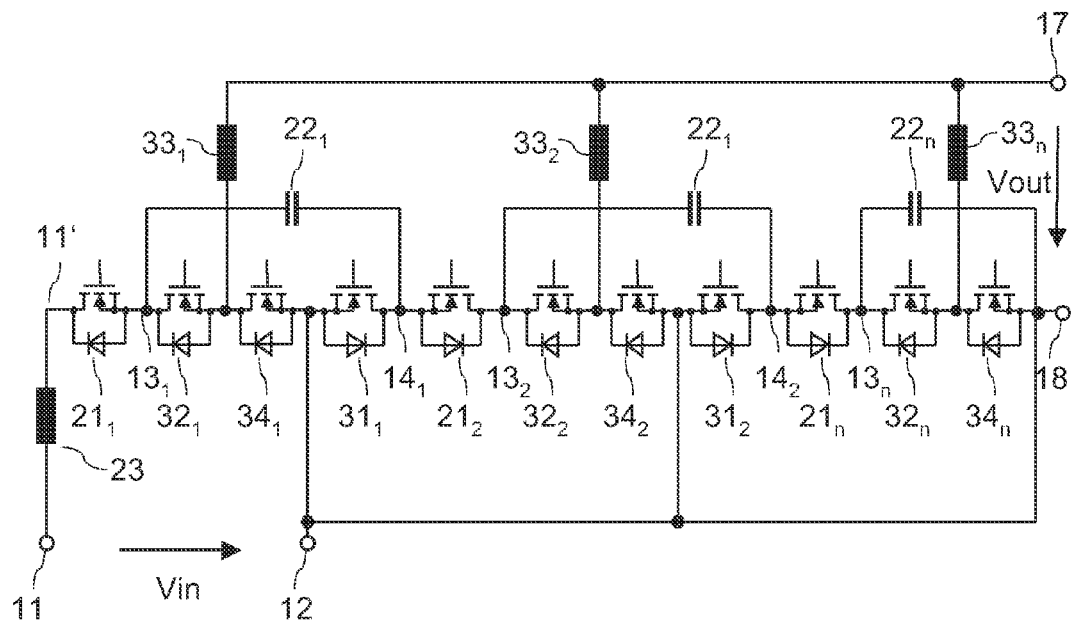
FIG. 22 shows a circuit diagram of a power converter circuit illustrated in FIG. 3 implemented with power converter units as illustrated in FIGS. 6 and 8.

FIG. 22 shows the equivalent circuit diagram of the power converter circuit illustrated in FIG. 4 when implemented with power converter units having a buck converter topology as illustrated in FIGS. 6 and 8, wherein the second switch $31_n$ of the lowermost power converter unit $3_n$ is omitted. In the power converter circuit shown in FIG. 22, the first switches $21_1$-$21_n$ of the supply units ($2_1$-$2_n$ in FIG. 4), the second switches $31_1$-$31_n$ of the power converter units ($3_1$-$3_n$ in FIG. 4), the control switches $32_1$-$32_n$ of the power converter units, and the rectifier elements $34_1$-$34_n$ ($34_i$ in FIGS. 6 and 8) are drawn as MOSFETs, in particular as n-type MOSFETs including a body diode, in FIG. 22. However, these MOSFETs could also be implemented as other types of transistors as well. In particular, the transistors illustrated in FIG. 22 could be implemented as illustrated in FIG. 21, and include one enhancement MOSFET and at least one JFET or depletion MOSFET connected in series with the enhancement MOSFET.

Figure 23:
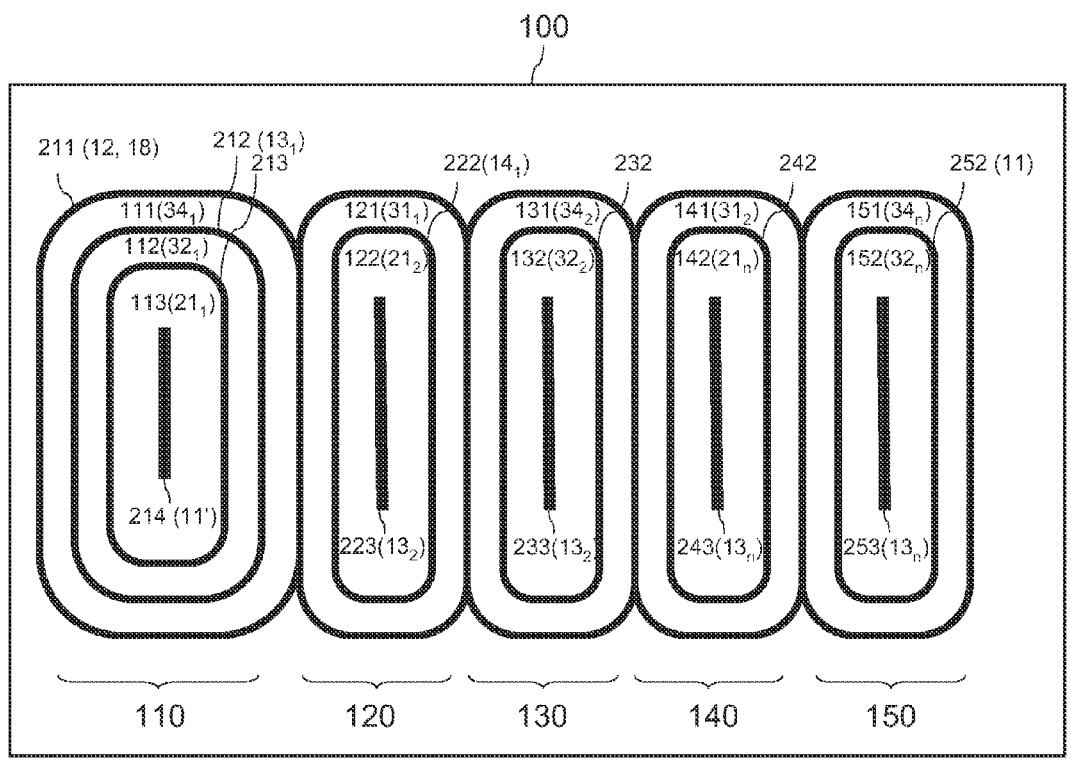
FIG. 23 schematically illustrates one embodiment of a top view of a semiconductor body in which switches of the power converter circuit as illustrated in FIG. 22 are integrated.

FIG. 23 schematically shows a top view of a semiconductor body 100 in which the switches of the power converter circuit shown in FIG. 22 are integrated. Referring to FIG. 23, the semiconductor body of FIG. 23 includes a plurality of electrically conducting lines 211-252 (illustrated as bold lines in FIG. 23). Each of these electrically conducting lines forms one of the circuit nodes of the power converter circuit and has at least one of the switches connected thereto.

The electrically conducting lines define a plurality of semiconductor regions. At least one of the switches is integrated in the semiconductor region. In FIG. 23, the individual lines are labeled with reference numbers 211-252, and the semiconductor regions are labeled with reference numbers 111-152. The reference numbers of the circuit node represented by the individual conducting lines are given in brackets in FIG. 23. Equivalently, the reference numbers of the switches integrated in the individual semiconductor regions is given in brackets in FIG. 23. For example, there is a semiconductor region 112 defined by conducting lines 212 and 213. Referring to FIG. 22 in connection with FIG. 4, conducting line 212 defines the first output node $13_1$ of the first supply unit $2_1$ and conducting line 213 defines the circuit node where the inductor $33_1$ of the first power converter unit $3_1$ is connected thereto. The second switch $32_1$ of the first power converter unit $3_1$ is integrated in the semiconductor region 112.

The electrically conducting lines 211-252 may include a conventional electrically conducting material, such as a metal, or a highly doped polycrystalline semiconductor material. Suitable metals are, for example, aluminum (Al), copper (Cu), gold (Au), silver (Ag), platinum (Pt), titanium (Ti). According to one embodiment, the one or more of the lines 211-252 are composite lines that include two or more different electrically conducting materials.

Figure 24:
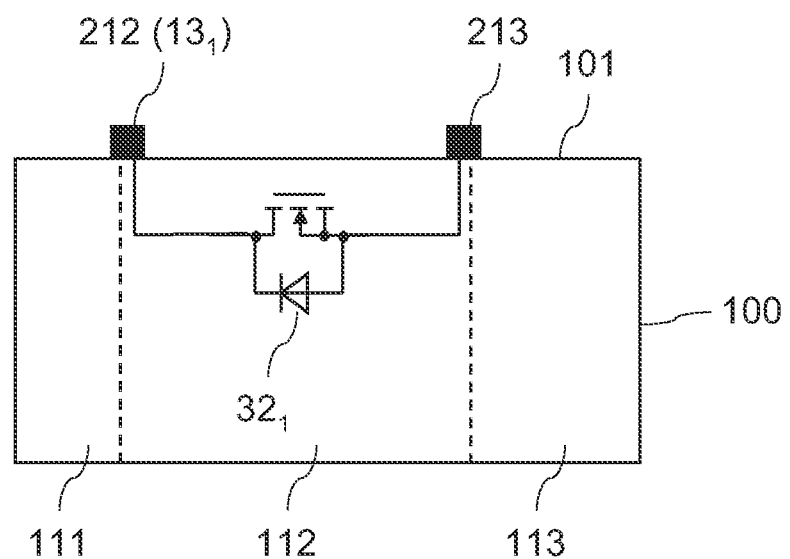
FIG. 24 schematically illustrates a vertical cross sectional view of a section of the semiconductor body shown in FIG. 23.

The electrically conducting lines 211-252 can be arranged above a surface of the semiconductor body 100 and/or can be arranged in trenches in the surface 101 of the semiconductor body 100. For explanatory purposes, FIG. 24 shows a vertical cross sectional view of one section of the semiconductor body 100 where the lines 212 and 213 and the semiconductor region 112 defined by these lines 212 and 213 are located. The relationship between other pairs of conducting lines and the semiconductor regions defined by these pairs is similar.

In the embodiment shown in FIG. 24, the electrically conducting lines are located above the surface 101 of the semiconductor body 100. The semiconductor region 112 defined by these lines 212, 213 is a semiconductor region in the semiconductor 100 below the lines 212, 213 and extending between these lines in a lateral direction of the semiconductor body 100 (the lateral direction being the direction parallel to the surface 101). This region 112 is illustrated in dashed lines in FIG. 24. In this semiconductor region 112 active regions of a transistor are integrated. This transistor is the control switch $32_1$ of the first power converter unit $3_1$ in the present embodiment. This transistor $32_1$ is represented by the circuit diagram in FIG. 24. This transistor $32_1$ can be implemented like a conventional transistor, in particular like a conventional lateral transistor, so that no further explanations are required in this regard. "Active regions" of the transistor are doped semiconductor regions, such as one or more of a source region, a body region, a drift region and a drain region. The load path (drain-source path in the present embodiment) of the transistor $32_1$ is connected between the electrically conducting lines 212, 213. Referring to FIG. 21, instead of only one transistor a series circuit with at least two transistors, such as an enhancement MOSFET and at least one depletion MOSFET or JFET can be connected between the conducting lines 212, 213.

Referring to FIG. 23, some of the conducting lines 211-252 form closed loops (are ring-shaped) such that there is at least one ring-shaped semiconductor region surrounding another ring-shaped semiconductor region. In the embodiment of FIG. 23, there is a first conducting line 211, representing the second input and the second output terminals 12, 18, that includes five closed loops. Two neighboring loops adjoin each other in this embodiment. However, they could also be spaced apart. Each of these loops 110-150 surrounds one semiconductor region 110-150, wherein each of these semiconductor regions is subdivided into at least two semiconductor regions, each including at least one of the switches.

For example, a first semiconductor region 110 includes a first ring-shaped semiconductor region 111 including the rectifier element $34_1$ of the first power converter unit and defined by a first loop of the first line 211 and a second ring-shaped line 211 (explained above). First semiconductor region 110 also includes a second ring-shaped semiconductor region 112 including the control switch $32_1$ of the first power converter unit and defined by the second line 212 and a third line 213. The second ring-shaped region 112 surrounds a third region 113 that is defined by the third line 213 and a contact pad 214. This contact pad 214 is an elongated pad in the present embodiment, but could also have any other geometry. The contact pad 214 is connected to a circuit node 11' between the inductor 23 (the freewheeling element is not shown in FIG. 22) and the first switch $21_1$. The first line that defines the semiconductor regions 110-150 can also be referred to as outermost conducting line of the individual ring structures.

In each of regions 111-113, at least one of the switches is integrated and is connected between the two lines defining the corresponding semiconductor region.

Referring to FIG. 23, a second semiconductor region 120 includes, a fourth ring-shaped semiconductor region 121 including the first switch $31_1$ of the first power converter and defined by a second loop of the first line 211 and a further ring-shaped line 222 representing the second output $14_1$ of the first supply unit. The fourth region 121 includes the first switch $31_1$ of the first power converter unit. The further ring-shaped region 121 surrounds a fifth region 113 that is defined by the further line 222 and a further contact pad 223, and that includes the second switch $21_2$ of the second power converter unit. While the first semiconductor region 110 includes three switches $21_1$, $32_1$, $34_1$ the second region only includes two switches $21_2$, $31_1$. Similarly, two switches are integrated in a third, fourth and fifth semiconductor regions 130, 140, 150 defined by third, fourth and fifth loops of the first line 211.

Referring to FIG. 23, one of the contact pad, namely the contact pad 214 in the first semiconductor region 23 is connected to the input terminal 11, or a circuit node 11' coupled to the input terminal 11 via an inductor 23. The other contact pads 223, 233, 243, 253 inside the other semiconductor regions 120-150 are connected to outputs of the supply circuit 2. The first line 211 surrounding all these semiconductor region is connected to one of the input terminals and/and or the output terminals.

In the embodiment of FIG. 23, the semiconductor body 100 includes five ring structures, wherein each ring structure includes at least one ring-shaped semiconductor region surrounding another ring-shaped semiconductor region. However, the number of ring structures is not restricted to five. Dependent on the number of supply units and converter units more or less than five ring structures can be implemented.

The concept explained before with reference to FIGS. 23 and 24 is not restricted to the implementation of electronic switches implemented as transistors. Other types of semiconductor devices can be integrated in the ring-shaped semiconductor regions and connected to the conducting lines defining the individual semiconductor regions as well.

According to one embodiment, at least one of the inductors $33_1$-$33_n$ is integrated in the semiconductor body. That is, the at least one inductor is formed by a coil either in the semiconductor body 100 or on top the surface 101 of the semiconductor body 100.

According to a further embodiment, one semiconductor body 100 comprises a plurality of ring shaped areas 110 to 150, that is more than one arrangement of physically connected ring shaped areas 110 to 150. This embodiment is advantageous to scale the output power of the circuit.

According to yet another embodiment, several semiconductor bodies 100 comprising each at least one arrangement of ring shaped areas 110 to 150 are mounted in the same package. Each arrangement of ring shaped areas share the same input voltage and output voltage.

According to yet another embodiment, several packages, each comprising at least one semiconductor body, each semiconductor body comprising at least one ring shaped area. Each arrangement of ring shaped areas share the same input voltage and output voltage.

In the description hereinbefore, directional terminology, such as "top," "bottom," "front," "back," "leading," "trailing" etc., is used with reference to the orientation of the figures being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

Spatially relative terms such as "under," "below," "lower," "over," "upper" and the like, are used for ease of description to explain the positioning of one element relative to a second element. These terms are intended to encompass different orientations of the device in addition to different orientations than those depicted in the figures. Further, terms such as "first," "second" and the like, are also used to describe various elements, regions, sections, etc. and are also not intended to be limiting Like terms refer to like elements throughout the description.

As used herein, the terms "having," "containing," "including," "comprising" and the like are open ended terms that indicate the presence of stated elements or features, but do not preclude additional elements or features. The articles "a," "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

It is to be understood that the features of the various embodiments described herein may be combined with each other, unless specifically noted otherwise.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A power converter circuit, comprising:
an input and an output;
a supply circuit configured to receive an input signal from the input and to generate a plurality of supply signals from the input signal; and
a plurality of converter units, wherein each of the plurality of converter units comprises a converter unit output port conductively connected to the output of the power converter circuit, and each of the plurality of converter units is configured to receive one of the plurality of supply signals and to output an output signal via the converter unit output port to the output of the power converter circuit, wherein
the supply circuit comprises a plurality of supply units connected in series, wherein each of the plurality of supply units is configured to output one of the supply signals,
each of the plurality of supply units is associated with one of the plurality of converter units,
the plurality of converter units comprises n converter units, wherein n is an integer greater than or equal to two,
at least n−1 of the n converter units comprises a coupling switching element configured to couple the supply unit associated with the one of the plurality of converter units to a reference potential node, wherein the reference potential node is conductively connected to the output of the power converter circuit, and
each of the plurality of supply units comprises a first capacitive storage element, and a first switching element connected in series with the first capacitive storage element.

2. The power converter circuit of claim 1, wherein the supply circuit further comprises an inductor connected in series with the plurality of supply units.

3. The power converter circuit of claim 1, wherein the first switching element comprises a transistor.

4. The power converter circuit of claim 1, wherein the supply circuit further comprises a plurality of second capacitive storage elements connected in series, wherein each of the plurality of second capacitive storage elements is connected in parallel with at least one of the plurality of supply units.

5. The power converter circuit of claim 4, wherein the power converter circuit further comprises a plurality of inductors, wherein each of the plurality of inductors is connected in series with at least one of the plurality of supply units.

6. The power converter circuit of claim 4, wherein the supply circuit comprises the plurality of second capacitive storage elements connected in series, wherein each of the second capacitive storage elements is connected in parallel with one of the plurality of supply units.

7. The power converter circuit of claim 1, wherein the coupling switching element comprises a first transistor and at least one second transistor connected in series.

8. The power converter circuit of claim 1, further comprising a control circuit configured to control the supply circuit and the plurality of converter units.

9. The power converter circuit of claim 8, wherein the control circuit is integrated in a first semiconductor body and wherein the supply circuit and the plurality of converter units are integrated in a second semiconductor body.

10. The power converter circuit of claim 1, wherein the output of the power converter circuit comprises first and second output nodes further comprising a capacitor connected between the first and second output nodes forming the output of the power converter circuit.

11. The power converter circuit of claim 1, wherein:
the output of the power converter circuit comprises a first output node and a second output node,
the converter unit output port of each of the plurality of converter units comprises a first converter unit output node and a second converter unit output node, and
the first converter unit output node of each of the plurality of converter units is connected to the first output node of the output of the power converter circuit, and the second converter unit output node of each of the plurality of converter units is connected to the second output node of the output of the power converter circuit.

12. The power converter circuit of claim 1, wherein the supply circuit is configured to operate the plurality of supply units in a charging mode at the same time, wherein in the charging mode the plurality of supply units receive energy from the input.

13. The power converter circuit of claim 1, wherein the coupling switching element is configured to directly couple the supply unit associated with at least one of the plurality of converter units to the reference potential node.

14. The power converter circuit of claim 1, wherein the coupling switching element is configured to connect the supply unit associated with the one of the plurality of converter units to the reference potential node in a supply mode of the supply circuit, and to disconnect the supply unit associated with the one of the plurality of converter units from the reference potential node in a charging mode of the supply circuit.

15. The power converter circuit of claim 1, wherein the input signal is an input voltage and the plurality of supply signals is a plurality of supply voltages.

16. A method comprising:
receiving an input signal from an input and generating a plurality of supply signals from the input signal by a supply circuit; and
receiving one of the plurality of supply signals and outputting an output signal to an output by each of a plurality of converter units, wherein each of the plurality of converter units comprises a converter unit output port conductively connected to the output, wherein
each of the plurality of supply signals is output by one of a plurality of supply units connected in series,
each of the plurality of supply units is associated with one of the plurality of converter units,
the plurality of converter units comprises n converter units, wherein n is an integer greater than or equal to two,
at least n−1 of the converter units comprises a coupling switching element configured to couple the supply unit associated with the one of the plurality of converter units to a reference potential node, wherein the reference potential node is conductively connected to the output, and
each of the plurality of supply units comprises a first capacitive storage element, and a first switching element connected in series with the first capacitive storage element.

17. The method of claim 16, wherein the input signal is an input voltage and the plurality of supply signals is a plurality of supply voltages.

18. The method of claim 16, wherein an inductor is connected in series with the plurality of supply units.

19. The method of claim 16, wherein the first switching element comprises a transistor.

20. The method of claim 16, wherein the supply circuit further comprises a plurality of second capacitive storage elements connected in series, wherein each of the plurality of second capacitive storage elements is connected in parallel with at least one of the plurality of supply units.

21. The method of claim 20, wherein each of the plurality of converter units further comprises a plurality of inductors, wherein each of the plurality of inductors is connected in series with at least one of the plurality of supply units.

22. The method of claim 20, wherein the supply circuit comprises the plurality of second capacitive storage elements connected in series, wherein each of the plurality of second capacitive storage elements is connected in parallel with one of the plurality of supply units.

23. The method of claim 16, wherein the coupling switching element comprises a first transistor and at least one second transistor connected in series.

24. The method of claim 16, further comprising controlling the supply circuit and the plurality of converter units by a control circuit.

25. The method of claim 16, further comprising operating the plurality of converter units in a charging mode at the same time, wherein, in the charging mode, the plurality of converter units receive energy from the input.

26. The method of claim 16, wherein the coupling switching element is configured to directly couple the supply unit associated with at least one of the plurality of converter units to the reference potential node.

27. The method of claim 16, wherein the coupling switching element is configured to connect the supply unit associated with at least one of the plurality of converter units to the reference potential node in a supply mode of the supply circuit, and to disconnect the supply unit associated with the at least one of the plurality of converter units from the reference potential node in a charging mode of the supply circuit.

28. A power converter circuit, comprising:
an input and an output;
a supply circuit configured to receive an input signal from the input and to generate a plurality of supply signals from the input signal; and
a plurality of converter units, wherein each of the plurality of converter units comprises a converter unit output port conductively connected to the output of the power converter circuit, and each of the plurality of converter units is configured to receive one of the plurality of supply signals and to output an output signal via the converter unit output port to the output of the power converter circuit, wherein
the supply circuit comprises a plurality of supply units connected in series, wherein each of the plurality of supply units is configured to output one of the supply signals,
each of the plurality of supply units is associated with one of the plurality of converter units,
the plurality of converter units comprises n converter units, wherein n is an integer greater than or equal to two,
at least n−1 of the n converter units comprises a coupling switching element that couples the supply unit associated with the one of the plurality of converter units to a reference potential node, wherein the reference potential node is conductively connected to the output of the power converter circuit, and
each of the plurality of supply units comprises a first capacitive storage element, and a first switching element connected in series with the first capacitive storage element.

29. The power converter circuit of claim 28, wherein the input signal is an input voltage and the plurality of supply signals is a plurality of supply voltages.

* * * * *